United States Patent [19]
Williamson

[11] Patent Number: 4,580,016
[45] Date of Patent: Apr. 1, 1986

[54] METHOD AND APPARATUS FOR CHECKING THE INTEGRITY OF A COMMUNICATIONS CHANNEL IN A VOICE STORE AND FORWARD SYSTEM

[75] Inventor: Michael R. Williamson, Dallas, Tex.

[73] Assignee: VMX, Inc., Richardson, Tex.

[21] Appl. No.: 653,212

[22] Filed: Sep. 24, 1984

[51] Int. Cl.⁴ ............................................. H04B 3/46
[52] U.S. Cl. ........................................... 179/175.3 R
[58] Field of Search ................ 179/175.2 C, 175.3 R, 179/175.3 F; 320/14, 17; 375/10; 371/22

[56] References Cited
U.S. PATENT DOCUMENTS
3,920,935 11/1975 Vierling et al. .............. 179/175.3 R

*Primary Examiner*—Stafford D. Schreyer
*Attorney, Agent, or Firm*—Jerry W. Mills; Gregory M. Howison

[57] ABSTRACT

Method and apparatus for determining the integrity of a communications channel includes a first communications system connected to a communications channel with a receiving communications system attached to the other end of the chennel. The first communications system generates a discrete frequency at the low end of the bandwidth for reception by the receiving system. The receiving system measures the frequency and the power level of the first tone. The first communications system then inhibits transmission for a predetermined duration of time during which the receiving system measures the noise floor of the communications channel. A second tone is then generated at the high end of the channel bandwidth for reception by the receiving system. The receiving system then compares the measured power levels of the first and second tone and the noise floor with predetermined criteria and determines the integrity of the communications channel from this comparison. If the integrity meets a prescribed level, voice messages are transmitted from the first communications system to the receiving communications system.

21 Claims, 16 Drawing Figures

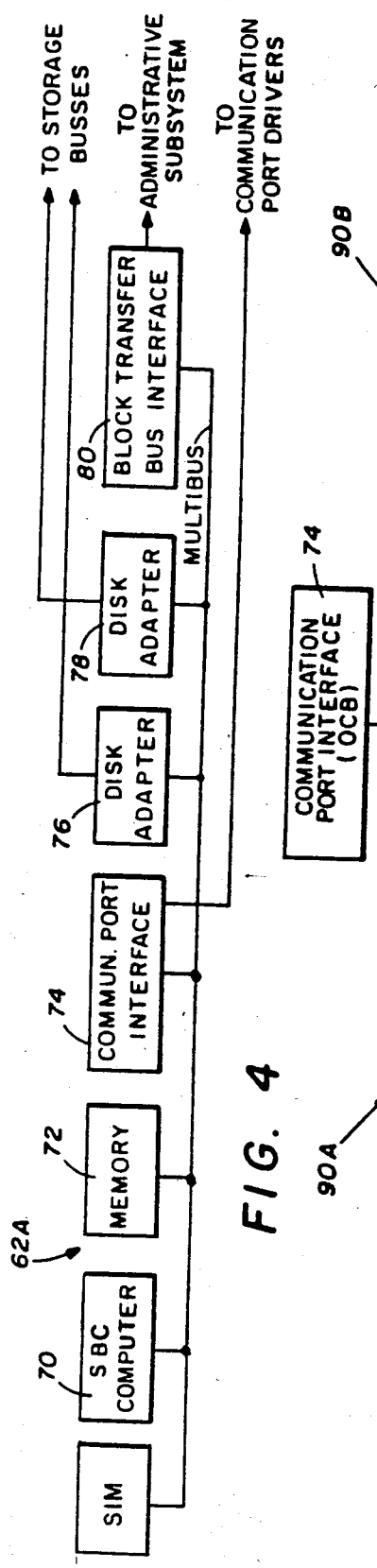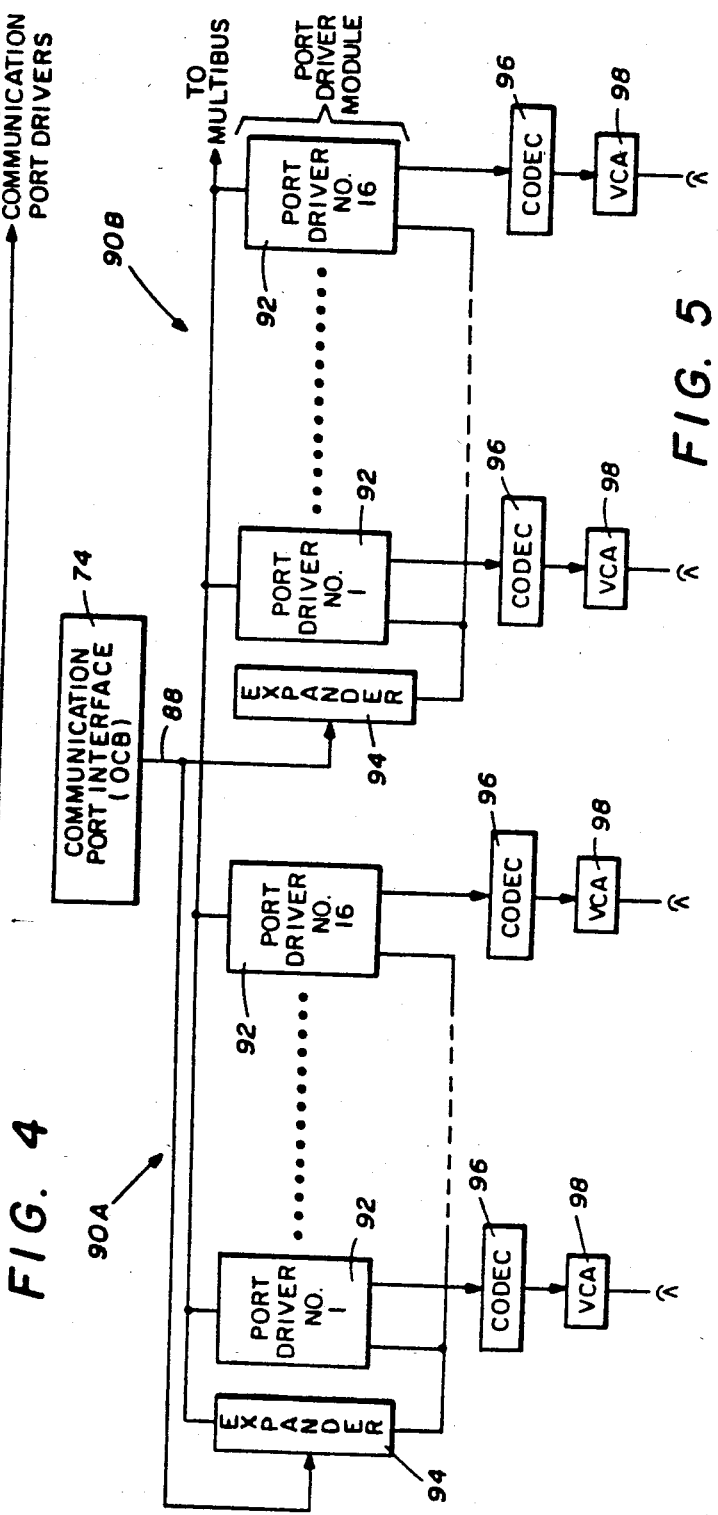

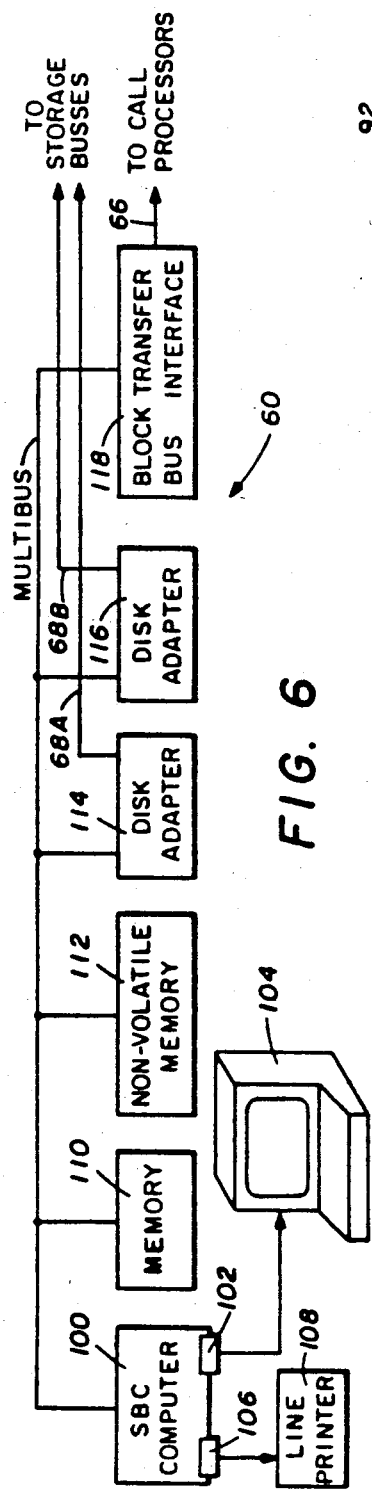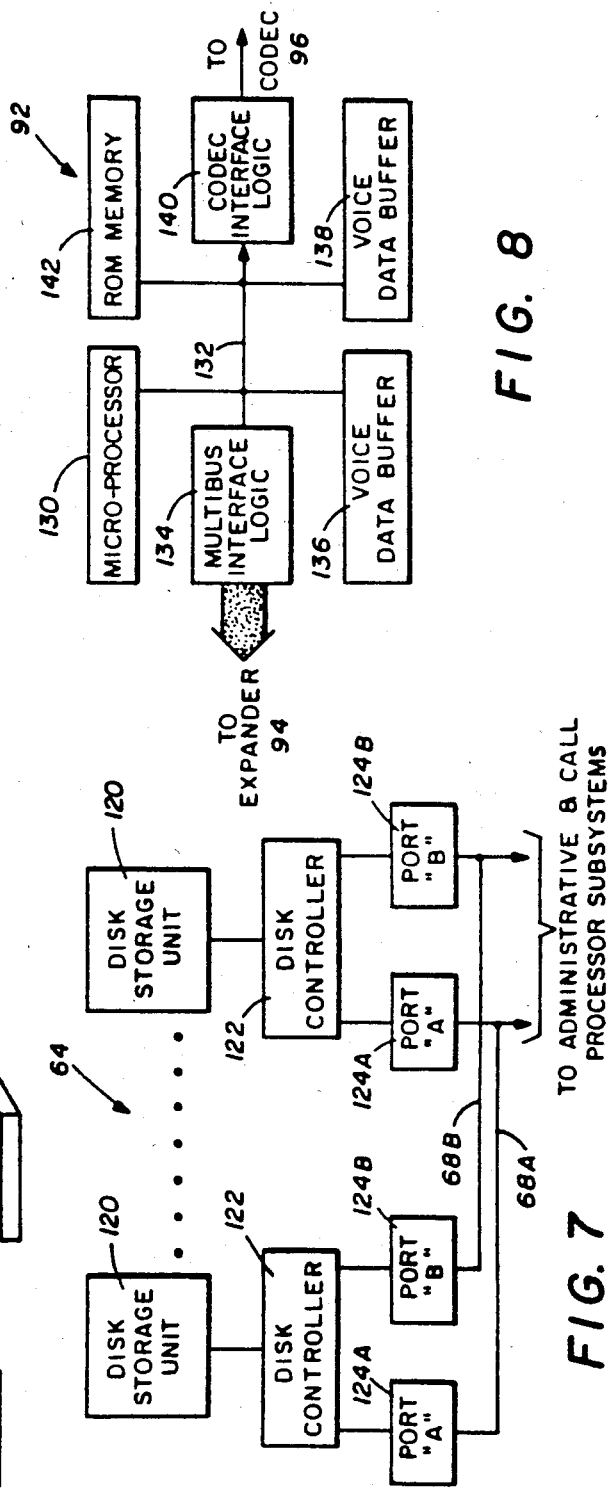

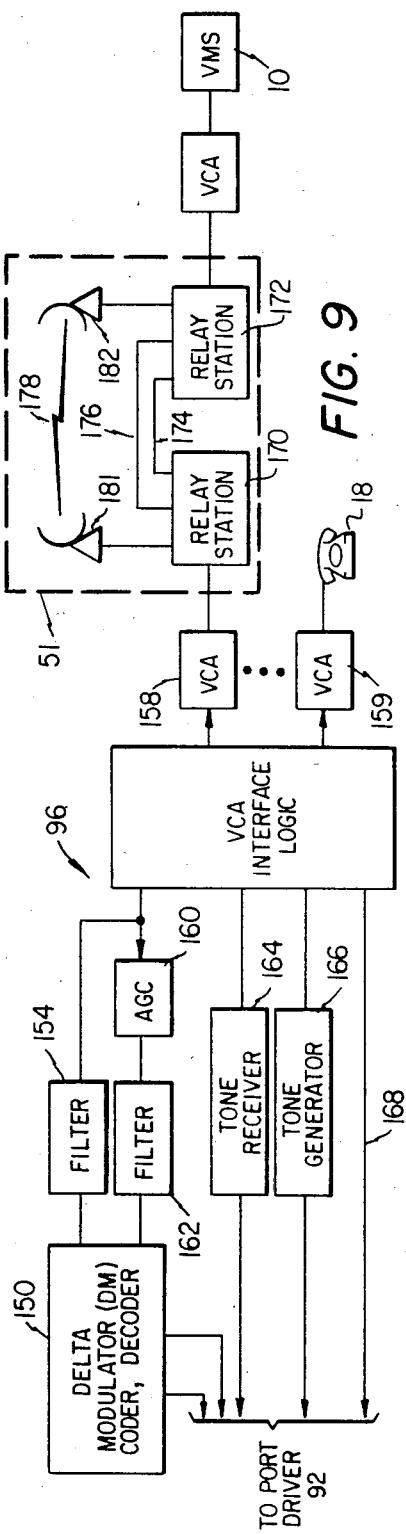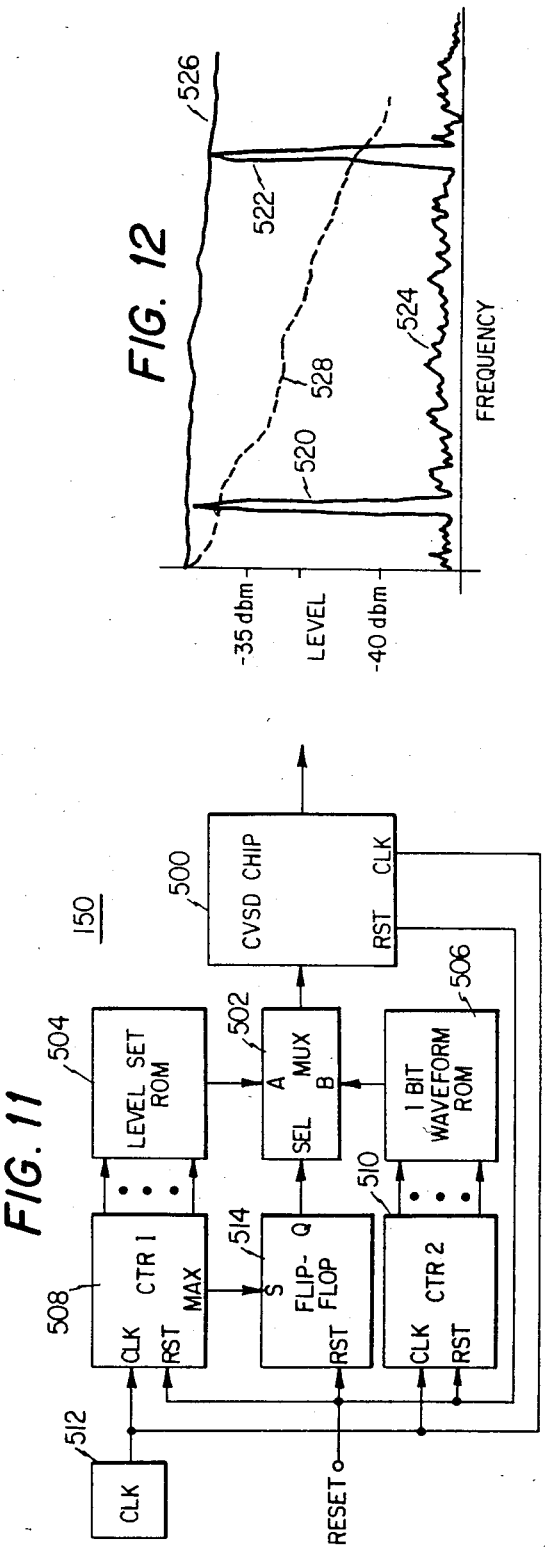

METHOD AND APPARATUS FOR CHECKING THE INTEGRITY OF A COMMUNICATIONS CHANNEL IN A VOICE STORE AND FORWARD SYSTEM

TECHNICAL FIELD

This invention relates to telecommunication networks, and more particularly a method and apparatus for determining the quality of a communications channel between two or more voice store and forward systems.

BACKGROUND OF THE INVENTION

U.S. Pat. No. 4,371,752, issued on Feb. 1, 1983 to Matthews et al discloses a voice store and forward system wherein a voice telephone message is digitized, stored and then played back in an analog form to the desired recipient. In order to extend the range of such a system, networks of such systems are utilized which transmit voice messages between the systems on communication channels. These communication channels can be in the form of telephone links such as telephone lines or satellite links.

In effecting an initial connection between two such systems in a network, various forms of addressing are utilized between the two systems to ensure that both are connected together. However, the readiness to receive or transmit data by the telephone systems in the network does not ensure an adequate communication link therebetween for voice transmission. Voice requires a transmission medium having a defined bandwidth in order to adequately reconstitute the voice. The quality of the channel must be sufficient over the entire voice bandwidth, rather than just a portion of it. Since present methods of initiating contact between two systems normally utilize digital transmission or an analog transmission with digital encoded information, the presence of a good digital or analog communication link for purposes of checking a connection does not necessarily ensure a good voice communication link. Therefore, there exists a need for a method of checking the integrity of the channel for voice transmission after a communication link has been effected.

SUMMARY OF THE INVENTION

The present invention disclosed and claimed herein comprises a method and apparatus for performing an integrity check on a communications channel between two systems and a communication network. The apparatus includes a frequency generator for generating a plurality of discrete frequencies covering the bandwidth of the communications channel. The frequency generator is controlled to output the discrete frequencies in a predetermined pattern from one of the communication systems in the network for transmission over the communications channel. The discrete frequencies are output at a predetermined power level and the receiving one of the communication systems in the network receives the discrete frequencies from the communications channel and measures the power level thereof. The power level of the discrete frequencies is then compared with predetermined criteria to determine the integrity of a communications channel.

In another embodiment of the present invention, the output of the discrete frequencies is inhibited for a predetermined duration of time such that the level of the noise floor over the communications channel can be determined. After determining the level of the noise floor, additional discrete frequencies are transmitted over the communications channel for reception.

In yet another embodiment of the present invention, the discrete frequencies are comprised of a high frequency tone and a low frequency tone. The low frequency tone is first generated for a predetermined duration of time such that the receiving communications system can measure the power level for that predetermined duration of time. After transmission of the low frequency tone, transmission is inhibited for a predetermined duration of time for measurement of the noise floor and then the high frequency tone is transmitted for a predetermined duration of time. By measuring high and low tone, an indication of the quality of the upper and lower band edges of the channel bandwidth can be determined.

BRIEF DESCRIPTION OF THE DRAWINGS

For a more complete understanding of the present invention and the advantages thereof, reference is now made to the following description taken in conjunction with the accompanying Drawings in which:

FIG. 4 is a block diagram of the call processor subsystem of the voice message system of FIG. 3;

FIG. 5 is a block diagram of the communication port interface, port driver modules and CODECE connecting the telephone hand sets;

FIG. 6 is a block diagram of the administrative subsystem for the voice message system of FIG. 3;

FIG. 7 is a block diagram of the storage subsystem of the voice message system of FIG. 3;

FIG. 8 is a block diagram of the port driver subsystem of the communication port interface of FIG. 5;

FIG. 9 is a block diagram of the CODEC of the port driver subsystem of FIG. 8;

FIG. 11 illustrates a block diagram of a continuously variable slope delta modulator;

FIG. 12 illustrates a waveform depicting the two tone measurement system;

DETAILED DESCRIPTION OF THE INVENTION

Figure 1:
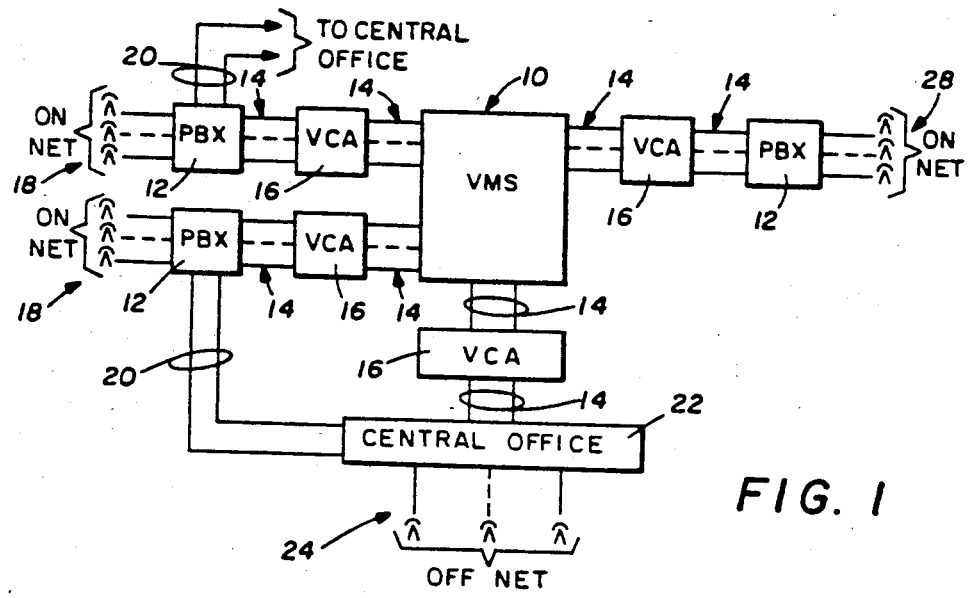
FIG. 1 illustrates a voice message system connected with multiple private exchanges of a customer and the central office of the telephone company.

Referring now to FIG. 1, a Voice Message System advanced verbal communication system (hereinafter "VMS") of the present invention is generally identified by the reference numeral 10. ("Voice Message System" and "VMS" are trademarks of VMX, Inc.) The VMS 10 is illustrated connected with a user's telephone communications network. This system is more fully described in U.S. Pat. No. 4,371,752, issued to Matthews et. al. on Feb. 1, 1983, which is incorporated herein by reference.

The telephone communications network illustrated in FIG. 1 includes multiple Private Branch Exchanges (hereinafter "PBX") 12 interconnected by tie lines 14 through Voice Connecting Arrangements (hereinafter "VCA") 16 to the VMS 10. The VMS 10 can also be connected to a PBX 12 with station lines. The VCA unit is supplied by the telephone company pursuant to Federal Communication Commission's tariff regulations to provide a line of demarcation between a private user's equipment and the telephone company's equipment. In addition to representing what are referred to as Private Branch Exchanges, the term "PBX" also includes but is not limited to PABX (Private Automatic Branch Exchange), EPABX (Electronic Private Automatic Branch Exchange) and various off premises switching systems.

The user's telephones 18 connected to the PBXs 12 have access to the VMS 10 and are generally referred to as being on the network or "ON NET". The features of the VMS 10 may be utilized by a small customer with a single PBX 12 or by much larger customers having multiple PBX's 12 interfaced with a single VMS 10. Of course, the PBX's 12 of a large corporate customer may be separated and located in distant physical facilities. Remotely located PBX's 12 may be interconnected to a central VMS 10 by other means than the tie lines 14, e.g., they could be connected by a microwave relay system.

The user's PBX's 12 are also connected through telephone lines 20 to a central office 22, of the telephone company. In addition, the central office 22 is interconnected through tie lines 14 and VCA 16 to the VMS 10. The VMS 10 can also be connected to the central office 22 through central office trunks. Telephones 24 outside the customer's own telephone communications network or "OFF NET" allow a user access to the improved communication capabilities provided by the VMS 10.

Figure 2:
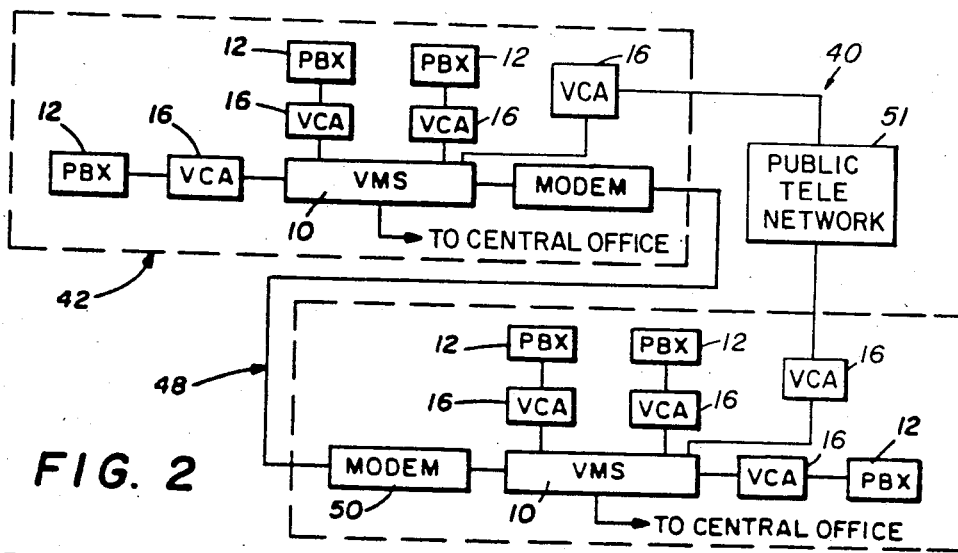
FIG. 2 illustrates a network of voice message systems.

Referring now to FIG. 2, a first VMS 10 is interconnected to a user's telephone communications network as illustrated in FIG. 1 and described above. The first VMS 10 is interconnected to a second VMS 10 to form a network of VMS systems 40. The first VMS 10 interconnected with its user's telephone communication equipment comprises a first node 42 of network 40, while the second VMS 10 with its user's telephone communication equipment comprises a second node 44 of network 40. The first VMS 10 is interconnected through a MODEM 46 for modulating the communications information from the first node 42 for transmission via the transmission link 48 to a MODEM 50. The MODEM 50 demodulates the information for use by the second VMS 10 of the second node 44. The transmission link 48 may comprise, for example, a microwave relay system for connecting nodes 42 and 44 of the VMS network 40. Such a transmission link 48 could be transmitted through a satellite communications system to provide an interconnection between distant VMS systems 10. The VMS systems are also interconnected through a public telephone network 51 for transmission of the data in analog format. Of course, the number and arrangement of interconnected VMS systems 10 are not limited to the arrangement of the VMS network 40 of FIG. 2.

The VMS systems 10 are functional to store and forward "voice messages". These voice messages, as will be described hereinbelow, can be generated from any of the peripheral devices attached to a particular one of the VMS systems 10 for storage therein. Inversely, the voice messages can be retrieved from storage and transmitted to either the user's ON NET telephone, an OFF NET telephone, a PBX or another VMS system 10.

Transmissions from the VMS system 10 to a telephone handset are affected by initiating contact with the VMS system 10 from the telephone handset and requesting delivery of the voice message. In this mode, the VMS 10 is essentially a slave device which retrieves the voice message on command from the user. However, it is possible that the VMS system 10 can initiate the contact by addressing the telephone handset and sensing the ringing thereof. When the "off hook" mode of the telephone handset is sensed, the VMS system then transmits or "delivers" the voice message to the handset. In this mode, the message delivered to the handset requires no further feedback to the VMS system 10 as to the integrity of the connection; that is, it is assumed that the user on the receiving end of the handset is ready to receive the message. Message delivery of voice messages will be described in more detail hereinbelow.

When the VMS system 10 is required to deliver a voice message to a peripheral device other than one where a user directly receives a message or requests a message, it is necessary to ensure that both the transmitting system and the receiving system are synchronized as to data transmission. If synchronization of the system is not achieved, there is a possibility that some voice message information will be lost. For example, when a VMS system 10 is required to deliver a message to another VMS system 10, the receiving system is addressed over an appropriate communications channel such as a telephone line by the transmitting system. The receiving system then effects a communications connection and sends an acknowledging signal back to the transmitting system to inform the transmitting system that a communications channel has been formed. The transmitting system then informs the receiving system over the communications channel that it has voice message information to be transmitted thereto and the receiving system sends back an acknowledgment and a signal indicating to the transmitting system that it is ready to receive the transmission. At the end of the transmission from the transmitting system, the transmitting system sends a signal indicating the end of the transmitted data and the receiving system corresponds with an appropriate acknowledging signal. All of the signals sent across the communications channel between the receiving and transmitting systems can be in the form of DTMF signals that are readily recognized by both systems. However, the quality or integrity of a communications channel with respect to the DTMF signals does not indicate the integrity of the communications channel with respect to transmission of voice. Therefore, a communications channel that adequately allows a communications channel to be effected does not ensure the integrity of the voice information that is transmitted thereover. The system of the present invention, as will be described hereinbelow, checks the integrity of the communications channel for the voice portion of the transmission.

Figure 3:
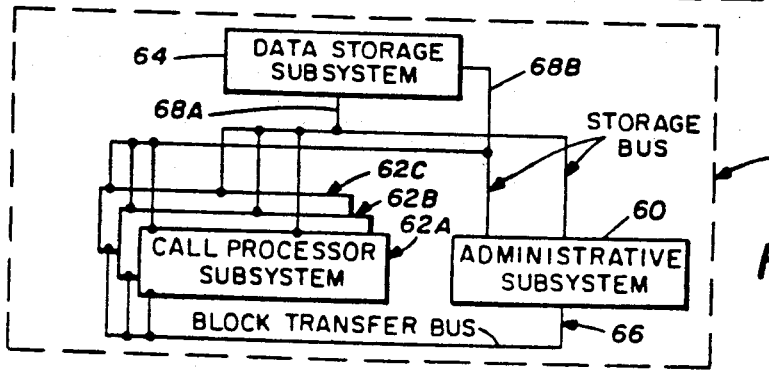
FIG. 3 is a block diagram of the voice message system of FIGS. 1 and 2.

Referring now to FIG. 3, the VMS 10 of FIG. 1 includes the following subsystems: an administrative subsystem 60, call processor subsystems 62A-62C, and a data storage subsystem 64. There is only one administrative subsystem 60 and data storage subsystem 64 for each VMS system 10, but there may be multiple call processor subsystems 62A-62C. The number of call processor subsystems 62A-62C required is a function of the number of telephone lines interfacing with the VMS 10. Thus, a VMS 10 may have one call processor subsystem 62A or any number of such subsystems. While there is one data storage subsystem 64 for the VMS 10, the size of the data storage subsystem 64 may vary, depending upon the number of disk files required for operation of the VMS 10. The data storage subsystem 64 functions as the storage medium for audio messages in the system. A message deposited from a caller is stored in the VMS system 10, and the message is later delivered to the addressee. Instructional messages are also stored in the data storage system 64 to guide the user in using the VMS 10.

A block transfer bus 66 allows each call processor subsystem 62A-62C to be connected to the administrative subsystem 60, as well as allowing each of the call processor subsystems 62A-62C to communicate with one another.

Data storage buses 68A-68B connect the administrative subsystem 60, the call processor subsystem 62A-62C and the data storage subsystem 64. The administrative subsystem 60 and each of the call processor subsystems 62A-62C have access to each of the data storage buses 68A-68B. The two data storage buses 68A-68B serve two functions. First, it provides redundancy in the VMS system 10, so that, if data storage bus 68A misfunctions, data storage bus 68B allows the VMS 10 to continue to operate. Secondly, when both of the data storage buses 68A-68B are functioning, it doubles the bandwidth of the data to be transmitted between the data storage system 64 and the call processor subsystems 62A-C and administrative subsystem 60.

Referring now to FIG. 4, the call processor subsystem 62A is illustrated in block diagram form. A single board computer 70 contains a microprocessor, some memory storage, and some input/output device interfaces. The single board computer 70 may be implemented by Intel's single board computer, from Intel, Model Number 80/30. The Intel 80/30 computer includes an 8085 microprocessor, a 16K RAM, 8K ROM, as well as some input/output device interfaces.

A call processor memory 72 provides memory for the call processor subsystem 62A and may be implemented by one or more individual boards containing RAM memory. A single board providing 64K bytes of RAM memory may be utilized as the call processor memory unit 72 and is commercially available from Intel as Model No. SVC064. A communications port interface 74 provides access to the communication port modules 90 of FIG. 5 described hereinbelow. Two identical disk adapters 76 and 78 interconnect with the data storage subsystem 64 of FIG. 3 through data storages buses 68A and 68B. Finally, a block transfer bus interface 80 is a hardware device required to interconnect with the block transfer bus 66 of FIG. 3.

The communication port interface 74, disk adapters 76 and 78, and the block transfer bus interface 80 are all implemented with an identical electronic unit, identified as a Universal Control Board. A Universal Control Board contains as Intel 8085 microprocessor, a RAM memory device, (approximately 500 bytes), a ROM memory device (approximately 2K-4K bytes), and a digital data bus interface. A Universal Control Board's function is determined by the program controlling the microprocessor. The operation of this Universal Control Board is described in detail in U.S. Pat. No. 4,371,752, which is incorporated herein by reference.

In addition to the memory provided in each of the Universal Control Boards, the communication port interface 74, disk adapters 76 and 78 and block transfer bus interface 80 all have access to the memory 72 of the call processor subsystem 62A. Thus, the microprocessors of these Universal Control Boards communicate with the single board computer 70 through the shared memory unit 72.

Referring now to FIG. 5, the communication port interface 74 of FIG. 4 interfaces with the communication port driver modules 90A-B through a communications port digital data bus 88. The communication port driver modules 90A-90B are identical with one another, and each port driver module 90A-B may include a maximum of 16 identical port drivers 92. An expander 94 is a device for expanding the communications port digital data bus 88 to the 16 port drivers 92 of each module 90A-B. Each port driver 92 is directly connected to a CODEC 96. The CODEC 96 is an abbreviated term for a circuit that functions as a coder/decoder. The CODEC 96 transforms the analog voice signal to a digital bit stream for processing in the VMS 10. The translated digital bit stream is fed up into the port driver 92 for distribution to the remainder of the VMS system 10. In addition, in transmitting a recorded message outbound from the VMS 10 to the user, the outbound digital bit stream comes from the port driver 92 into the CODEC 96 where it is translated back into an analog voice signal which is fed into the receiver of the telephone 18 of the user. A single communication port interface 74 can drive up to 32 port drivers 92, which is equivalent to 32 telephone circuits to the VMS 10. As required by the FCC tariff regulations, the CODEC 96 interfaces through a voice connecting arrangement 98 with the telephone 18 of the user.

FIG. 6 illustrates the hardware implementing the administrative subsystem 60 of FIG. 3. The hardware implementing the administrative subsystem 60 is very similar to that implementing the call processor subsystem 62A illustrated in FIG. 4 and described above.

A single board computer 100 (hereinafter "SBC 100") operates as the central processing unit for the administrative subsystem 60, and it is implemented by a programmable single board computer, commercially available from Intel, Model No. 80/30. The SBC 100 has one input/output interface 102 connected to a cathode ray terminal 104, which serves as the operator's console for the VMS 10. The second input/output interface 106 of the SBC 100 drives a line printer 108. The line printer 108 functions to produce reports and status information concerning the operation of the VMS 10, and it also displays alarms for abnormal conditions during the system operation. One such alarm condition would result from the failure of a recorded message to be transmitted from the VMS 10 in a predetermined period of time.

A memory unit 110 comprised of printed circuit boards provides the memory for the administrative subsystem 60. The memory unit 110 may be made up of one or more individual printed circuit boards, each having 64K bytes of RAM. These printed circuit boards are commercially available from Intel, Model SBC064. A nonvolatile memory unit 112 provides memory for the administrative subsystem 60 so that the data stored in memory is not destroyed if the system loses power. The memory unit 112 could also be implemented with core memory having a capacity of 8 to 16K bytes.

Two identical disk adapters 114 and 116 interconnect through the data storage buses 68A-68B to the data storage subsystem 64 of FIG. 3. The disk adapters 114 and 116 are implemented with a Universal Control Board having its microprocessor programmed for the unit to run as a disk adapter. Finally, a block transfer bus interface 118 is connected to the block transfer bus 66 through the call processor subsystem 62A of FIG. 3. The block transfer bus interface 118 is also implemented with a Universal Control Board having a microprocessor programmed to control the unit's operation.

FIG. 7 is a block diagram of the data storage subsystem 64 of the VMS 10 of FIG. 3. FIG. 7 illustrates two identical disk storage units 120 with their associated disk controller 122. Each disk controller 122 interfaces with the remainder of the system through disk ports 124A and 124B through the data storage buses 68A and 68B. While FIG. 7 illustrates two identical disk storage units 120 with their associated disk controllers 122, the data storage subsystem 64 consists of any number of such identical units. The configuration of the VMS subsystem 10 of FIG. 3 requires a minimum of two disk storage units 120, but additional units may be added to increase the storage capacity of the system.

The entire disk storage unit 120 may be implemented by using a Storage Technology Corporation disk drive, Model Number 2700. The STC Model 2700 disk storage unit 120 is a rotating magnetic disk having a capacity for 200 million 8 bit bytes of digital or binary information. Each disk unit contains its own dedicated disk controller 122 which is built around a microprocessor. The disk controller 122 may be implemented with a Motorola microprocessor, Model Number 6801, 64K bytes of RAM memory, and it also includes a special purpose digital hardware to drive the input/output disk ports 124A and 124B into the disk unit 120 and to directly control the disk storage unit 120. As additional disk storage units 120 are added to the system, their associated disk ports 124A and 124B are connected to the data storage buses 68A and 68B.

The VMS system 10 is provided with a minimum of two disk storage units 120, since the functioning of the disk storage units 120 is essential to the entire VMS system. The two data storage buses 68A and 68B are provided to achieve redundancy in the system. If one of the buses goes out of service, then the other bus still has access to all of the disk units 120 through the single remaining bus. With a single data bus in operation, the system will still operate, but it will not have the same throughput capability in terms of the amount of data that can be processed by the VMS 10. However, when both disk storage buses 68A and 68B are running at normal operation, this allows twice as much information to be fed into and out of the storage system 64 than could be accomplished with a single data storage bus.

A separate disk controller 122 dedicated to the operation of each disk storage unit 120, enables blocks of information to be more efficiently transferred within the VMS 10. For example, in transferring a block of information from the call processor subsystem 62A or the administrative subsystem 60 to or from the disk storage unit 120, the transfer does not occur in real time from one of the data storage buses 68A or 68B onto the disk unit 120. The block of information is transferred into the RAM storage of the disk controller 122, and then the disk controller 122 controls the operation of transferring the block of information from its RAM directly into the disk unit 120. In this way, the VMS 10 storage bus 68A or 68B is not tied up for the period of time it takes to write a block of information directly onto the disk 120; rather, it is occupied only for the period of time it takes to transfer that block of information into the RAM of the disk controller 122.

FIG. 8 is a block diagram of one of the port drivers 92 of FIG. 5. The central control unit of the port driver 92 is an Intel 8085 microprocessor 130 connected by an internal bus 132 to the remainder of the port driver system 92. The microprocessor 130 is programmed to control a digital logic hardware device, identified as a bus interface logic unit 134. The bus interface logic 134 is an 8 or 16 bit wide parallel data path serving as the electrical interface between the expander 94 in all of the port drivers 92. The bus interface logic 134 consists of a bus backplane into which are plugged the boards for the port drivers 92 and expanders 94.

Voice data buffers 136 and 138 are connected to the remaining components of the port driver 92 through the internal bus 132. The voice data buffers 136 and 138 function to temporarily store the incoming or outgoing data bit streams of the digitized voice signal incoming or outgoing to the CODEC 96. The voice data buffers 136 and 138 interface through a CODEC interface logic unit 140 to the CODEC 96. A ROM memory unit 142 stores the program for the microprocessor 130.

The operation of the dual voice data buffers 136 and 138 may be illustrated by the example of digitized voice data being received by the port driver 92 from the CODEC 96. The voice data entering the port driver 92 is temporarily stored in one of the dual voice data buffers 136 or 138. When the selected voice data buffer is full, that entire block of data is transmitted out to the expander 94 up to the communication port interface 74 of the call processor 62A. At the same time when the port driver 92 senses that the first voice data buffer is full, the second voice data buffer is used to store the subsequent voice data from the CODEC 96. The port driver system 92 is programmed to control the dual voice data buffers 136 and 138 in the transmitting mode and the storing mode. The voice data buffers 136 and 138 are implemented in RAM semiconductor memory in the range of 512–2K bytes.

FIG. 9 is a block diagram of the CODEC 96 of FIG. 5. A delta modulator 150 (hereinafter "DM 150") is connected to the port driver 92. The DM 150 functions as either a coder for converting analog signals to digital signals, or a decoder for converting digital signals to analog signals. The operating mode of the DM 150, whether it is functioning as a coder or decoder, is controlled by one of the interface signals 152 to the port driver 92. The DM 150 implements a particular technique for converting analog to digital and digital to analog.

The DM 150 decodes the digital waveform to an analog signal and passes it through filter 154 which is a voice band filter with a cutoff frequency of approximately 2700 hertz. The analog signal output from the filter 154 is input to a VCA interface logic circuit 156. The VCA interface 156 is operable to interface between either a VCA 158, which interfaces with the public telephone network 51, or with a VCA 159, which interfaces with an ON NET telephone 18. The VCA 158 is required by the FCC Tariff Regulations as the line of demarcation between the equipment of the telephone company and the equipment of a private user.

Depending upon the desired recipient of the information transmitted, the information can be transmitted directly to another VMS 10 or over the telephone network 51, as described above with reference to FIG. 2.

Normally, transmission over the telephone network 51 comprises transmission to a relay station 170 for relay to a relay station 172. The relay station 172 is connected through a VCA 174 to another VMS 10 located at a remote location.

The analog signal from the telephone 18 or the telephone network 51 is transmitted through the respective VCA 158 or 159 and VCA interface logic 156 to an automatic gain control circuit (AGC) 160, which serves to amplify the analog voice signal from the VCA to a predetermined output level. As will be described hereinbelow, the AGC 160 has a programmable gain controlled by the VMS system. The amplified analog signal from AGC 160 is passed through another bandpass filter 162 for passing frequencies in the range of approximately 300 hertz to 2700 hertz. The filtered analog signal is then fed into the DM 150, which is functioning as a coder, and transformed into a digital bit stream to be fed to the port driver 92.

The first function of the CODEC 96 has been described above in providing the data path for the incoming and outgoing voice signals from the telephone 18 to the VMS system 10. An ancillary function of the CODEC 96 is provided by a tone receiver 164, which receives the analog waveforms generated by the signal from a touchtone type of telephone 18 and converts these waveforms to digital information corresponding to the tone received. A tone generator circuit 166 provides the analogous function in converting digital signals from the VMS 10 to the receiver of the user telephone 18. The tone generator 166 functions to generate touchtones as well as progress tones acknowledging the status of the operation of the VMS 10. The tone generator 166 functions to form the outgoing dialing in a touchtone system. A pulse dialing path 168 is provided to receive pulse dialing coming in from a rotary telephone 18, and it also functions to do the outbound dialing to a rotary telephone 18.

The relay stations 170 and 172 are interconnected by communications links which can be in the form of conventional telephone lines 174 and 176 or wireless communications link 178 between two transmitter/receivers 180 and 182. However, once the selection of the communication link is made, the telephone network 51 monitors only the presence of a connection and it is up to the user's at either end of the communications link to determine the integrity of the communications channel.

The VMS 10 systems that are connected to either end of the communications link must synchronize transmission and reception in order to effect a proper transfer of data. To accomplish this, the receiving system acknowledges an attempt to connect by sending an acknowledging signal over the communications link. The transmitting system, which is in an idle mode, receives this acknowledging signal and sends a "ready to transmit" signal to the receiving system. Upon receipt of this "ready to transmit" signal to the receiving system. Upon receipt of this "ready to transmit" signal, the receiving system sends a "ready to receive" signal. When the transmitting system receives the "ready to receive" signal, it transmits the data and, upon completion, transmits a "data transmitted" signal. The receiving system receives the data and, upon receipt of the "data transmitted" signal, transmits a "data received" signal to let the transmitting system know that all the data has been received.

Although data is effectively transmitted over the communications link and stored in the receiving system, the integrity of the data has not been checked. The only signals that are necessary in order to effect a transfer of data are the various acknowledging signals. Therefore the communications channel need only accommodate the acknowledging signals. Since these acknowledging signals are normally touch tone digits, a poor channel response to voice would not necessarily deteriorate the reception or transmission of the acknowledging signals, thereby allowing the data to be transferred but not insuring the integrity of the communications channel with respect to voice communications. As will be described hereinbelow, the present invention determines the integrity of the communications channel with respect to voice.

Figure 10A:
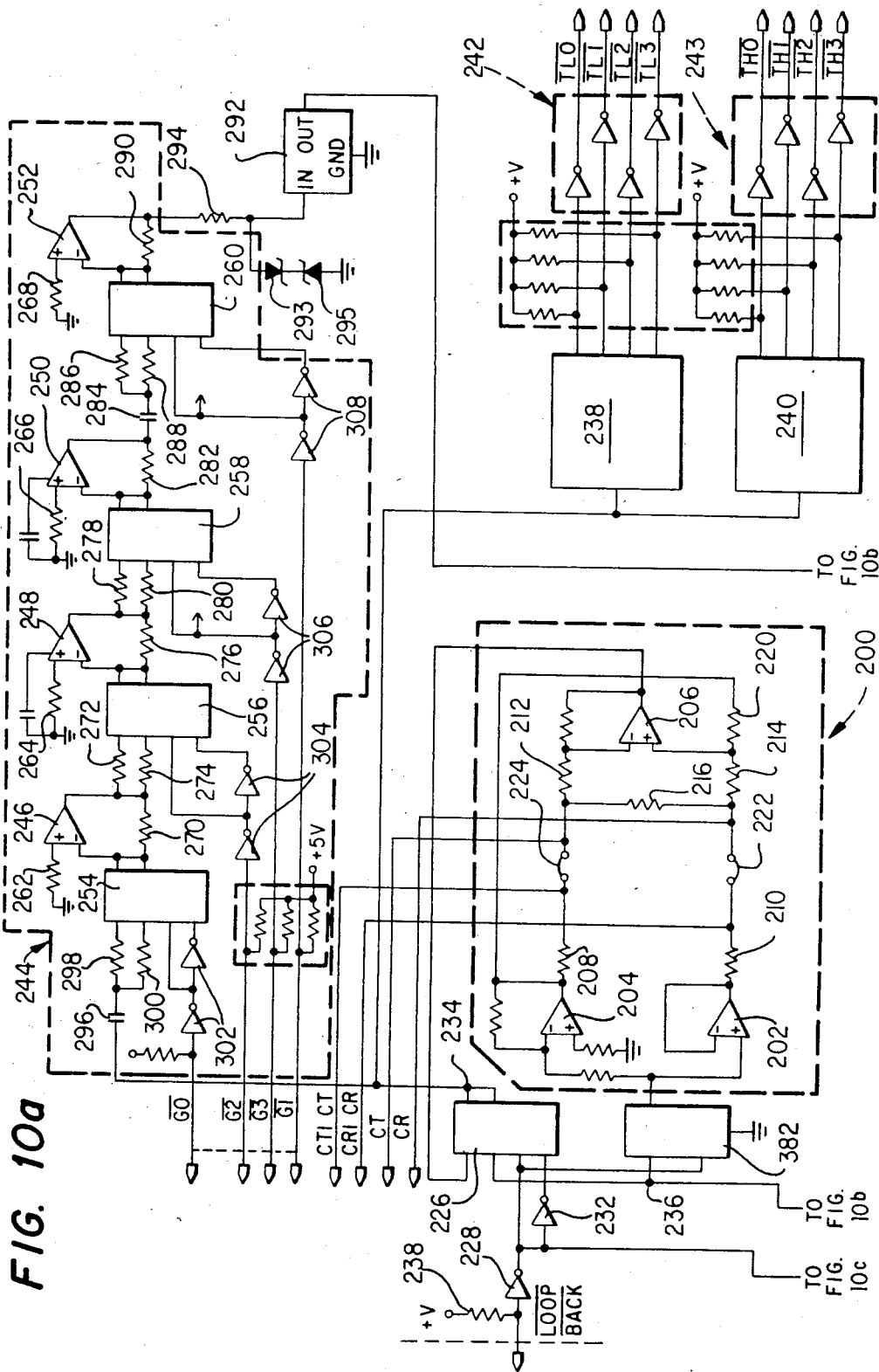
FIGS. 10a to 10c are schematic drawings of the CODEC of FIG. 9.
Figure 10B:
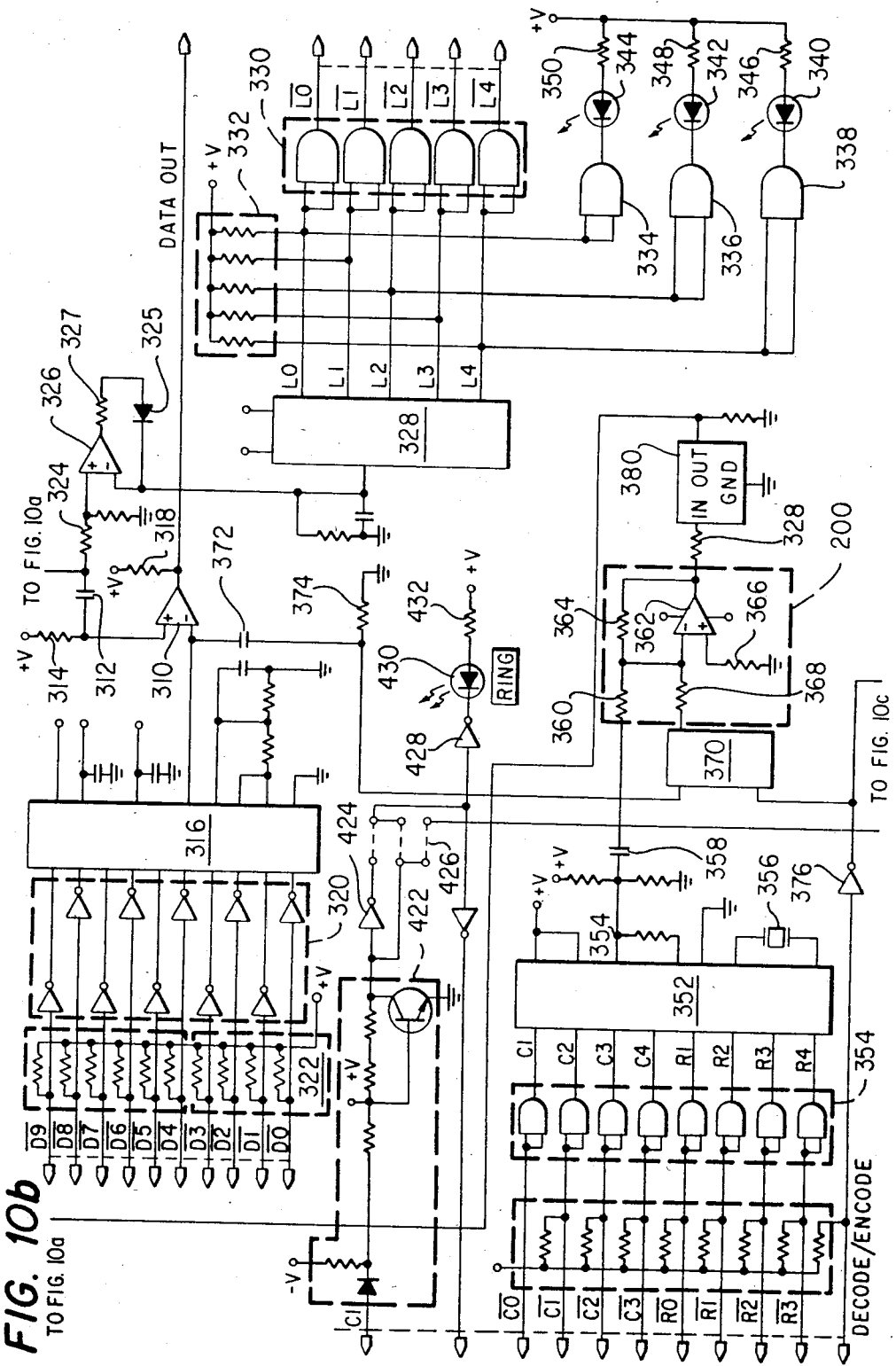
Figure 10C:
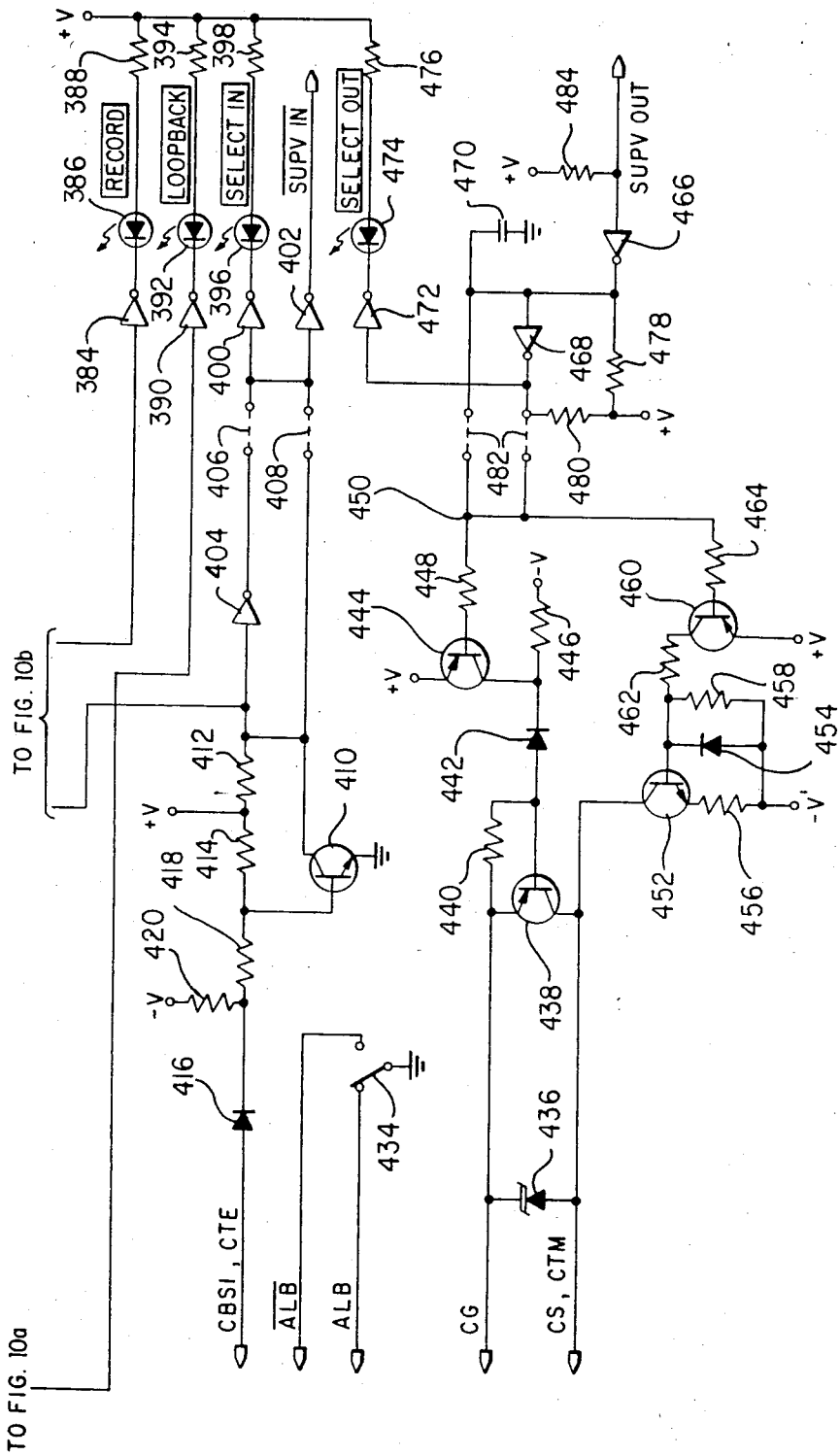

Referring now to FIGS. 10a–10c there is illustrated a schematic diagram of a portion of the Codec illustrated in FIG. 9. The schematic diagram refers to the portion of the Codec that converts the analog to the digital and the digital to the analog. The schematic diagrams of FIG. 10 also include the tone receiver 164 and the tone generator 166 of FIG. 9 that convert a digital signal to a DTMF digit and also convert a DTMF digit back to a digital word. The VCA interface logic 156 of FIG. 9 now outputs a tip and ring signal which is input to the circuit of FIG. 10a on the connectors labeled CT1, CR and CR1, CR. This is for two-wire transmission only. The situation where four-wire transmission is allowed by the telephone company will be described hereinbelow.

The tip and ring signals are input to a signal conditioning circuit 200 which is comprised of operational amplifiers 202, 204 and 206 (hereinafter referred to as op amps). Op amp 202 is configured as a unity gain noninverting amplifier by connecting the negative input thereof to the output thereof. The op amp 204 is configured as an inverting amplifier. The components attached to the input terminals and the output terminal of op amp 204 have values determined by the desired gain. These values can be determined from design equations that are found in the Linear Applications Handbook from National Semiconductors Corp. In the present application, the gain of the op amp 204 is set for unity gain. It should be understood that although a unity gain amplifier has been utilized for the amplifier 202, a design for an op amp having a gain larger than one can be implemented by inserting a noninverting gain operational amplifier circuit in place of the unity gain amplifier.

The output of op amp 204 is connected to the CT1, CT input line by a resistor 208. The output of op amp 202 is connected to the input, line CR1, CT through a resistor 210. The resistors 208 and 210 are buffer resistors and provide a certain degree of isolation between the outputs of the op amps 202 and 204 and the lines CR1, CR and CT1, CT. In the configuration shown, op amps 202 and 204, both having unity gain, form a complimentary amplifier. This complimentary amplifier is used to drive the telephone line which is connected to the lines CT1, CT and CR1, CR. The impedance of the telephone line is 600 ohms.

Op amp 206 is configured as a differential amplifier having the positive input thereof connected through a resistor 212 to the CT1, CT terminal and the positive input thereof connected through a resister 214 to the CR1, CR terminal. The gain of the differential amplifier is set equal to unity for the present application and it functions as a receiver to receive signals from the telephone line. A resistor 216 is connected between the terminal CT1, CT and CR1, CR. The output of the op amp 204 is connected through a resistor 220 to the positive input of the op amp 206. The resistor 220 acts as a summing resistor to allow the output of the op amp 204 to sum with the difference signal detected by the op amp 206. The resistor 220 in effect subtracts or cancels the two signals at the positive input of the op amp 206. The purpose of the resistor 220 is to reduce or eliminate transmitted signals output by op amps 202 and 204 from appearing on the output of op amp 206.

A jumper 222 and a jumper 224 are connected between the resistors 210 and 214 and the resistors 208 and 212, respectively. The purpose of the jumpers 222 and 224 is to accommodate four-wire telephone lines. The four-wire telephone line makes provisions for transmission on two of the four wires and reception on the remaining two wires, thereby providing increased isolation. In a four-wire system, the transmission occurs on the terminal CT1, CT and CR1, CR and reception occurs on the input terminals CT and CR which are connected to the opposite sides of the jumpers 222 and 224 from the terminals CT1, CT and CR1, CR.

In applications where a particular system requires the presence of higher gain receiving amplifiers or higher gain transmitting amplifiers, the signal conditioner 200 is constructed such that it can be replaced to accommodate a particular system. This allows the circuit a higher degree of flexibility from unit to unit which can be customized to a customer's specification.

The output of the op amp 206 is connected to one input of a dual analog gate 226. The analog gate 226 is of the type 7G201 manufactured by Siliconix, Inc. An inverter 228 has the input thereof connected to a signal line labeled $\overline{\text{LOOP BACK}}$ and the output thereof is connected to one of the control inputs of the analog gate 226 and controls the connection of the output of the op amp 206 to the output of the analog gate 226. A pullup resistor 230 is connected between the input of the inverter 228 and the positive supply voltage. An inverter 232 has the output thereof connected to the other control input of the analog gate 226 and input thereof connected to the output of the inverter 228. The two outputs of the dual analog gate 206 are connected to a node 234 and the inverters 228 and 232 are operable to selectively connect one of the inputs of the dual analog gate 226 to the node 234. The other input of the analog gate 226 is connected to a node 236.

A DTMF receiver 238 and a DTMF receiver 240 have the input thereof connected to the node 234. The DTMF receivers are operable to receive the received analog signal and, if DTMF signals are present, discriminate the signals into logic signals corresponding to the various tones. The receivers 238 and 240 output a separate digit for each of eight discrete tones. The eight tones are 697 Hz, 770 Hz, 852 Hz, 941 Hz, 1209 Hz, 1336 Hz, 1477 Hz, and 1633 Hz. The receivers 238 and 240 are of the type 550 manufactured by Frequency Devices Inc. Each of the four lower frequencies are operable to individually activate one of the four outputs of the receiver 238. The four outputs of the receiver 238 are inverted by a group of inverters 242 to provide the signals $\overline{\text{TL0}}$, $\overline{\text{TL1}}$, $\overline{\text{TL2}}$, and $\overline{\text{TL3}}$, which correspond to increasing frequencies. The four digital outputs of the receiver 240 are individually activated by the four higher frequencies and these outputs are inverted by a group of four inverters 243 to provide the output signals $\overline{\text{TH0}}$, $\overline{\text{TH1}}$, $\overline{\text{TH2}}$, and $\overline{\text{TH3}}$. The outputs $\overline{\text{TL0}}$-$\overline{\text{TL3}}$ are the low tone digital outputs of the DTMF and the outputs $\overline{\text{TH0}}$-$\overline{\text{TH3}}$ are the high tone digital outputs. The outputs provide digital signals that are input to the circuit of FIG. 8.

A programmable gain amplifier 244 is comprised of op amps 246, 248, 250 and 252. Each of the op amps 246-252 is configured as an inverting amplifier having a gain specified by the components attached thereto. The gain of each of the op amp circuits is controlled by a series of four dual analog gates 254, 256, 258, and 260 similar in type to the analog gate 226. Each of the dual analog gates 254-260 have both outputs connected together and each of the outputs are connected to the negative input of each of the op amps 246-252, respectively. The positive input of the op amp 248 is connected to ground through a resistor 264. The op amp 250 has the positive input thereof connected to ground through a resistor 266. The op amp 252 has the positive input thereof connected to ground through a resistor 268. The output of the op amp 246 is connected to the negative input thereof through a series resistor 270 and connected to the first and second inputs of the dual analog gate 256 through resistors 272 and 274, respectively. The op amp 248 has the output connected thereof to the negative input thereof through a series resistor 276 and connected to both inputs of the dual analog gate 258 through series resistors 278 and 280, respectively. The op amp 250 has the output thereof connected to the negative input thereof through a series resistor 282 and to the input of a capacitor 284. The other end of the capacitor 284 is connected to both inputs of the dual analog gate 260 through series resistors 286 and 288, respectively.

The op amp 252 has the output thereof connected to the negative input thereof through a series resistor 294. A zener diode 293 has the cathode thereof connected to the cathode of a zener diode 295 and the anode thereof connected to the input of the filter 292. The anode of the diode 295 is connected to ground. Diodes 293 and 295, provide a limiting function for the input of the filter 292. The filter 292 reduces some of the high frequency components to allow conversion to digital signals. It is of the type 28-1637 manufactured by Alladdin. The node 234 is connected to one side of a capacitor 296 and the other end of the capacitor is connected to both inputs of the dual analog gate through series resistors 298 and 300 respectively.

A digital signal $\overline{\text{G0}}$ is connected to the control inputs of the dual analog gate 254 by a serially connected pair of inverters 302. The serially connected inverters 302 provide both the inverted and noninverted forms of the signal $\overline{\text{G0}}$. This allows the signal $\overline{\text{G0}}$ to control the operation of the digital analog gate 254. In this manner, the analog signal passed, through the capacitor 296 is input to the op amp 246 through a selected one of the resistors 298 and 300 depending upon the state of the signal $\overline{\text{G0}}$. A digital signal $\overline{\text{G2}}$ is connected to the control inputs of the analog gate 256 by a serially connected pair of inverters 304. The capacitor 296 is input to the op amp 246 through a selected one of the resistors 298 and 300, depending upon the state of the signal $\overline{\text{G0}}$. A digital signal $\overline{\text{G2}}$, is connected to the control inputs of the analog gate 256 by a serially connected pair of inverters 304. A digital signal $\overline{\text{G3}}$ is connected to the control inputs of the analog gate 258 by a pair of serially connected inverters 306. A digital signal $\overline{\text{G1}}$ is connected to the control inputs of the analog gate 260 through a pair of serially connected inverters 308. The digital signals $\overline{\text{G1}}$-$\overline{\text{G3}}$ control the operation of the analog gates 256–260 in a manner similar to the control of the analog gate 254 by the signal $\overline{G0}$.

The operation of each of the op amps 246 and the gain thereof, will be described with reference to only the op amp 246. The op amp 246 is connected as an inverting amplifier with the resistor 270 serving as the feedback resistor and the resistors 262 and one of the resistors 298 and 300 serving as the gain select resistors. The analog gate 254 selects which of the resistors 298 or 300 are to be part of the gain circuit. The values of these resistors can be selected according to design equations that can be found in the Linear Applications Handbook published by National Semiconductor Corporation. Depending upon, the state of the signal G0, resistor 298 or resistor 300 can be selectively connected to the negative input of the op amp 246 to comprise one leg of the gain circuit. This provides two degrees of freedom in choosing the gain of the amplifier. The resistor 270 has a value equal to the value of one of the resistors 300 and 298 such that the gain can be set to unity. Therefore, the gain of the amplifier circuit can be either unity or higher depending upon the value of the remaining resistor of the pair connected to the input of the analog gate 254. Each of the op amp circuits 248, 250 and 252 operate in a similar manner, thereby providing 16 levels of gain depending upon the signals $\overline{G0}$–$\overline{G3}$. In the present application, the gain range is from 0 to 60 Db in increments of approximately 4 Db.

The output of the filter 292 is connected to the positive input of a comparator 310 through a series capacitor 312. The positive input of the comparator 310 is connected to the positive voltage supply through a resistor 314. The negative input of the comparator 310 is connected to the output of a digital to analog converter (D/A) 316. The output of the comparator 310 is connected to the positive voltage supply through a pullup resistor 318. The comparator 310 is of the type LM311 manufactured by National Semiconductors Corp.

The D/A converter 316 is a general purpose 10 bit device which is operable to receive 10 bits of information from the Delta modulator 150 of FIG. 9 and convert this digital information to analog signals. The digital word is input on the line labeled $\overline{D0}$–$\overline{D9}$ and inverted by a series of ten inverters 320. The inverters 320 each have the input thereof connected to one of the data lines $\overline{D0}$–$\overline{D9}$ and the outputs thereof connected to one of the ten inputs of the D/A converter 316. Each of the inverters 320 have the inputs thereof connected to one of a plurality of resistors in a resistor bank 322, each of the resistors having the other end attached to the positive voltage supply. The resistors 322 perform a pullup function for the input of the inverter 320. The D/A converter 316 outputs an audio signal in response to a digital signal input from the bus on the data lines $\overline{D0}$–$\overline{D9}$ and this audio signal is input to the negative input of the comparator 310. The comparator 310 compares the output of the D/A converter 316 and the output of the filter 292 to output a signal DATA OUT.

When the signal is being received off of the telephone line and an analog signal is output from the filter 292 having an amplitude determined by the gain of the programmable gain amplifier 244, the system generates another signal on the data lines $\overline{D0}$–$\overline{D9}$ which is output by the D/A converter 316 for comparison. This is a correction signal that is generated in response to a signal that the system thinks is present. This drives the digital portion of the Delta modulator 150 of FIG. 9 to adjust its digital value to the converter 316 for the next sample. It should be understood that when the analog to digital conversion is not performed on the circuit shown in FIGS. 10a–10c an analog signal must be sampled in order to convert it to a digital representation. The compensation is performed for each sample to compensate the quality of the sound and the rate of this sampling is many times faster than the frequencies present in voice information.

The output of the filter 292 is also connected through a resistor 324 to the input of a peak detector 326. The peak detector 326 utilizes a general purpose op amp to perform the detection by connecting the output to the negative input thereof through a series connected diode 325 and resistor 327 and tapping the output off of the negative input thereof. A five-bit level detector IC 328 has the input thereof connected to the output of the peak detector 326 and each of the five outputs thereof connected to the input of an individual one of a series of five AND gates 330 configured as buffers. Each of the outputs of the AND gates 330 are labeled $\overline{L0}$, $\overline{L1}$, $\overline{L2}$, $\overline{L3}$, and $\overline{L4}$ and represent various levels for the audio signal. A series of pullup resistors 332 connect each of the five outputs of the level detector 328 to the positive voltage supply through a single resistor. The output of the five bit level detector outputs a digital bit on each output in a sequential fashion dependent upon the input analog level such that the lowest level corresponds to the signal $\overline{L0}$ and the highest level corresponds to the signal $\overline{L4}$. The IC 328 is of the Type TL489 manufactured by Texas Instruments Inc. An AND gate 334 configured as a buffer has the input thereof connected to $\overline{L0}$ from the level detector 328, an identically configured AND gate 336 has the input thereof connected to $\overline{L2}$ from the level detector 328 and an identically configured AND gate 338 has the input thereof connected to $\overline{L4}$ from the level detector 328. Each of the AND gates 334–338 have the outputs thereof connected to the cathode of a light-emitting diode (LED) 340, 342, 344, respectively. Each of the LEDs 340–344 are connected to the positive voltage supply through a pullup resistor 346, 348, and 350, respectively. LED 344 indicates that the audio level is low, LED 342 indicates that the audio level is medium, and the LED 340 indicates that the audio level is high. The LED's are located physically on the front panel of the system so as to inform an operator of the condition of the audio level.

A tone generator 352 receives digital information from the bus described above and generates an output DTMF signal on an output node 354. The tone generator 352 is of the type MK5089 manufactured by Mostek, Incorporated. The tone generator 352 has the capability of producing eight different tones. These tones can be produced one at a time or two at a time. There are a series of high-frequency tones and low-frequency tones, the frequency of which were described hereinabove with reference to the receivers 238 and 240. The digital signals for the high-frequency tones are received on the data lines $\overline{R0}$, $\overline{R1}$, $\overline{R2}$, and $\overline{R3}$. The data lines $\overline{C0}$–$\overline{C3}$ and $\overline{R0}$–$\overline{R3}$ are buffered by a series of AND gates that have the individual inputs thereof connected to the respective data line and the outputs thereof connected to a corresponding individual input of the tone generator 352. The frequency of the tones on the tone generator 352 are controlled by a crystal 356.

The output node 354 is connected through a capacitor 358 and through a series resistor 360 to the negative input of an op amp 362. The op amp 362 is part of the signal conditioning circuit 200, as indicated by the dashed line. A resistor 364 is connected between the output and the negative input of the op amp 362. A resistor 366 is connected between the positive input of the op amp 362 and ground. The resistors 360, 364 and 366 in conjunction with the op amp 362 form a unity gain inverting amplifier. A resistor 368 is connected between the output of an analog gate 370 and the negative input of the op amp 362. The resistor 368 in conjunction with the remaining resistors 364 and 366 results in a higher gain for the amplifier than that using the resistor 360. The overall amplifier circuit utilizing the op amp 362 is a summing amplifier with resistors 360 and 368 serving as the summing resistors which sums the output of the analog gate 370 and the tone generator 352. The input to the analog gate 370 is connected to the output of the D/A converter 316 through a capacitor 372. A resistor 374 is connected between the input of the analog gate 370 and ground. An inverter 376 has the input thereof connected to a DECODE/ENCODE line and the output thereof connected to the control input of the analog gate 370. The signal on the DECODE/ENCODE line is operable to sum the output of the D/A converter 316 with the output of the tone generator 352. The op amp 362 performs a mixing function on the two outputs.

The output of the op amp 362 is connected through a resistor 378 to a filter 380. The filter 380 is similar to the filter 292 and functions to filter out high frequency components of the D/A converter 316 and the tone generator 352. The output of the filter 380 is connected to the input of an analog gate 382 at the node 236. The control input of the analog gate 382 is connected to the output of the inverter 228 and is controlled by the LOOP BACK signal.

In the encode mode, the analog gate 370 connects the output of the D/A converter 316 through the op amp 362 on the signal conditioning board 200 to the input of the analog gate 382. When the analog gate 382 is activated, the signals from the D/A converter 316 are transmitted to the input of the op amps 304 and 302 along with the output of the tone generator 352 and from there to the telephone line. In the decode mode, information from the D/A convertor is not mixed with the output of the tone generator 352.

The analog gates 226 and 382 are operable to respond to the LOOP BACK signal to remove signals internal to the analog board from the telephone lines for purposes such as testing. When the LOOP BACK function is activated, the analog gate 382 is deactivated to prevent signals, from inputting to the signal conditioning circuit 200. The dual analog gate 226 has the analog gate connecting the output of the signal conditioning circuit 200 to the programmable gain amplifiers 244 deactivated and the remaining gate therein activated to connect the output of the, filter 380 to the programmable gain amplifier 244. This effectively connects the output of which comprises the mixed signals from the tone generator 352 and the D/A converter 316.

An inverter 384 has the input thereof connected to the output of the inverter 376 and the output thereof connected to the cathode of an LED 386 to provide a buffer for driving the LED 386. The anode of the LED 386 is connected to the positive voltage supply through a resistor 388. The DECODE/ENCODE signal, in addition to controlling the gate input of the analog gate 370, also drives the LED 386 to indicate on the front panel if the system is in the encode mode which is the mode wherein a message is recorded. An inverter 390 has the input thereof connected to the output of the inverter 228 and the output thereof connected to the cathode of an LED 392. The anode of the LED 392 is connected through a resistor 394 to the positive voltage supply. The LED 392 indicates when the LOOP BACK signal is present.

An LED 396 has the anode thereof connected to the positive voltage supply through a series resistor 398 and the cathode thereof connected to the output of an inverter 400. The LED 396 indicates the select in function on the front panel of the system. The input of the inverter 400 is also connected to the input of an inverter 402 that outputs the SUPV IN signal. The input of the inverters 400 and 402 are connected to either the input or the output of an inverter 404 by selectively connecting one of two jumpers 406 and 408, as indicated by the dashed lines. The input of the inverter 404 is connected to the collector of a transistor 410, the emitter of which is connected to ground. The collector of the transistor 410 is connected to the positive voltage supply through a resistor 412 and the base of the transistor 410 is also connected to the positive voltage supply through a resistor 414. A control signal CBS1, CTE, which is derived, from the VCA 16, is input to the anode of a diode 416, the cathode of which is connected to the base of the transistor 410 through a series resistor 418. The cathode of the diode 416 is also connected to, the negative voltage supply through a resistor 420. The diode 416 and the transistor 410 with its associated components convert the signal input to drive the various inverters and logic that is normally comprised of TTL logic. The positive voltage supply is normally +5 volts for this type of logic. The jumpers 406 and 408 allow for positive or negative signalling to the input of the inverters 400 and 402.

Referring to FIG. 10b, a circuit 422 converts a negative voltage signalling to a positive voltage signalling similar to the, conversion afforded by the transistor 410, the diode 416 and the resistors 412, 414, 418, and 420. The signal input to the circuit 320 is labeled C1 and is derived from VCA board 16 and indicates when the VCA 16 detects a ring signal. The output of the circuit 422 is connected to the input of an inverter 424 and a series of jumpers 426 are utilized to connect either the input of the invertor 424 or the output of the inverter 424 to the input of an inverter 428. The output of the inverter 428 is connected to the cathode of an LED 430 and the anode of the LED 430 and the anode of the LED 430 is connected to the positive voltage supply through a resistor 432. The LED 430 indicates the presence of a ring signal and is labeled RING. The jumpers 426 are operable to connect the detected RING signal to the input of the inverter 404 to provide the noninverted signal.

A switch 434 is operable to generate an alarm busy signal ALB. It is also used for maintenance mode operations. The switch 434 in one position puts on an ALB s:gnal and in the other position puts out the inverted ALB signal. This signal is input to the VCA 16 and forces a BUSY condition so that the line is busied, it also sends a signal to the circuit microboard of FIG. 8 which enables an operator to simulate an incoming call and do on-board testing.

Referring to FIG. 10c, a transient suppressor diode 436 has the cathode thereof connected to the input line labeled CG and the anode thereof connected to the input line labeled CS, CTM. A PNP transistor 438 has the emitter thereof connected to the cathode of the diode 436 and the collector thereof, connected to the anode of the diode 436. A resistor 440 is connected, between the emitter and the base of the transistor 438. A diode 442 has the anode thereof connected to the base and the cathode thereof connected to the collector of a PNP transistor 444. The collector of the transistor 444 is connected to the negative voltage supply through a resistor 446 and the emitter thereof is connected to the positive voltage supply. A resistor 448 connects the base of the transistor 444 to a node 450.

A transistor 452 has the collector thereof connected to a negative voltage supply −V' through a resistor 456. The base of the transistor 452 is connected to −V' through a resistor 458 and the anode of the diode is also connected to −V'. A PNP transistor 460 has the emitter thereof connected to the positive voltage supply, the collector thereof connected to the base of the transistor 452 through a resistor 462 and the base thereof connected to the node 450 through a resistor 464. The transistors 438 and 444 and the diode 442 form a circuit that converts positive voltage supply signalling that is output by TTL logic to a signalling voltage in the range of −24 volts. The transistors 452 and 460 with their associated circuitry provide a source for the signal to the −V' voltage level.

A signal input line labelled $\overline{\text{SUPV}}$ $\overline{\text{OUT}}$ is connected to the input of an inverter 466. A resistor 484 has one end thereof connected to the input of the inverter 466 and the other end thereof connected to the positive voltage supply to provide a pullup function. The output of the inverter is input to the input of an inverter 468 and one end of a capacitor 470. The other end of the capacitor 470 is connected to the ground. The output of the inverter 468 is connected to the input of an inverter 472. The output of the inverter 472 is connected to the cathode of an LED 474 and the anode thereof is connected to the positive voltage supply through a resistor 476. The LED 474 gives an indication of the SELECT OUT function that is on the front panel. Resistors 478 and 480 connect the outputs of the inverters 466 and 468 to the positive voltage supply, respectively. A pair of jumpers 482 allow for selection of the inverted or non-inverted, function for input to the base of the transistor 444 for conversion to −24 V signalling.

Referring now to FIG. 11, there is illustrated a schematic diagram of a continuously variable slope delta modulation circuit 500 (CVSD) which can be of the type HC55504 manufactured by Harris Semiconductor. The CVSD circuit 500 performs the combined functions of both the Delta Modulator circuit 500 and the D/A converter 316 of FIG. 25b. The CVSD circuit 500 has the input thereof connected to a multiplexer 502. The multiplexer 502 is a digital multiplexer and connects the digital input of the CVSD circuit 500 to either the A input of the multiplexer 502 or the B input thereof. The A input of the mutliplexer 502 is connected to the output of a level-set ROM 504 and the B input of the multiplexer 502 is connected to the output of a waveform ROM 506. The ROM's 504 and 506 are one bit wide, that is, they output only one bit of information at a time.

The level-set ROM 504 has the address inputs thereof connected to a counter 508 and the waveform ROM 506 has the address inputs thereof connected to the output of a counter 510. The counters 508 and 510 have the clock inputs thereof connected to the output of a clock circuit 512. In this configuration, both the counters 508 and 510 sequence through a select set of addresses for the respective one of the level-set ROM 504 or the waveform ROM 506. Depending upon the state of the multiplexer 502, the output of the level set ROM 504 or the output of the waveform ROM 506 will be connected to the input of the CVSD circuit 500 and will input thereto a sequence of bits.

The selected input of the multiplexer 502 is connected to the Q output of a set-reset flip flop 514. When the flip flop 514 is reset, the A input of the multiplexer 502 is connected to the input of the CVSD circuit 500 and when the flip flop 514 is set, the B input of the multiplexer 502 is connected to the input of the CVSD circuit 500. The reset input of flip flop 514 is connected externally to the system such that the central processing unit can reset the flip flop 514 in response to the software instructions. The set input of the flip flop 514 is connected to the counter 508 to receive the highest order bit output thereby. In addition to being connected to the reset input of the flip flop 514, the external reset signal is also connected to the reset inputs of the counters 508 and 510 and also to the reset input of the CVSD circuit 500.

In operation, a reset signal RESET is generated and resets the flip flop 514, the counters 508 and 510 and the CVSD circuit 500. The counters 508 and 510 then begin to sequence through their count, which is a binary count, and recycle at the end of that count. However, when the counter 508 reaches the end of its count, the flip flop 514 is set thereby connecting the B input of the multiplexer 502 to the CVSD circuit 500. With the data so routed, the output of the waveform ROM 506 is input to the CVSD circuit 500. Since the counter 510 is configured as a ring counter, the sequence of bits output by the waveform ROM 506 are repeated. This continues until the VMS system is taken out of the transmit mode.

The sequence of bits stored in the level set ROM 504 determines the level at which a synthesized tone will be output by the CVSD circuit 500. In order to properly implement the sequence of bits, the CVSD circuit 500 is first reset from the external reset signal and then the sequence of bits from the level set ROM 504 is input thereto. After the level is set, the pattern of bits received from the waveform ROM 506 determines the fluctuations in the output of the CVSD circuit 500. This is essentially a synthesized tone wherein the sequence of bits output by the waveform ROM 504 defines one cycle. This cycle causes the signal level to rise above the set level and then below the set level in a sinusoidal manner. The sequence then repeats for each cycle of this sinewave pattern, thereby resulting in a tone. In order to determine what the output signal will be, it is only necessary to select the sequence of bits supplied to the CVSD circuit 500. In order to determine the bit sequences that must be input to the CVSD circuit 500 to set either the level or the signal pattern, the bit sequence patterns must be predefined. The operation of for continuously variable slope delta modulation is further described in Rabiner and Schafer, *Digital Processing and Speech Signals*, Prentice Hall.

In order to change the frequence of the tone, the only parameter that needs to be changed is the frequence of the clock 512. Since both the CVSD circuit 500 and the counter 510 are clocked by the clock 512, the bits output by the waveform ROM 506 have a bit rate that is directly dependent on the clock rate of the clock 512. By increasing both this bit rate and the clock rate of the CVSD, the tone frequency can be altered.

Referring now to FIG. 12, there is illustrated a waveform depicting the frequency response of the tones generated by the circuit of FIG. 11 compared to the communications channel over which the tones are transmitted. A first tone is generated at the low end of the channel bandwidth for the communications channel and is represented by a frequency peak 520. A second tone can also be generated that is at the high end of the bandwidth for the communications channel and is represented by a frequency peak 522. The noise floor is represented by a waveform 524. The actual frequency response of a typical communications channel is represented by a waveform 526 and it has a level that is above −35 dbm. The noise floor 524 for an acceptable channel is well below −40 dbm. It should be understood that the actual frequency response of a given communications channel depends upon the insertion loss of the communications link. For example, a typical signal level output by the transmitting system is set to approximately −10 dbm. If the receiving system is connected thereto through a relatively low loss communications channel with a loss of approximately −20 db, then the level at the receiving system would only be −30 dbm. However, for a high loss channel or for a channel with a skewed bandwidth, the signal may disappear into the noise floor. If this happens, the signal to noise ratio of the system will be significantly degraded and reconstruction of the data at the receiving system would be inhibited. Therefore, a window is defined as criteria for the integrity test that is between −40 dbm and −30 dbm wherein the noise floor must be below the −40 dbm level and the signal level of the test tones 520 and 522 must be above the −35 dbm level. By transmitting a tone first at the low end of the frequency band and then the high end of the frequency band, an operator can obtain a determination that a good communications channel exists between two systems. A frequency response represented by a dotted line 528 illustrates a skewed response wherein the high end of the response is greatly attenuated. When the high frequency tone transmitted over this communications channel is received by the receiving system, it is less than −35 dbm, thereby indicating a bad connection. Although only two tones were utilized, it should be understood that any number of tones at varying levels can utilized, such that different points in the frequency band can be checked.

In order to detect the level at the receiving system, the programmable gain amplifier 244 of FIG. 10a is set to a predetermined gain and the output from the level detectors 238 and 240 determined. If the level is to high or undetectable, the gain of the amplifier 244 is changed until the detected level is within the range of the detectors 238 and 240.

Figure 13:
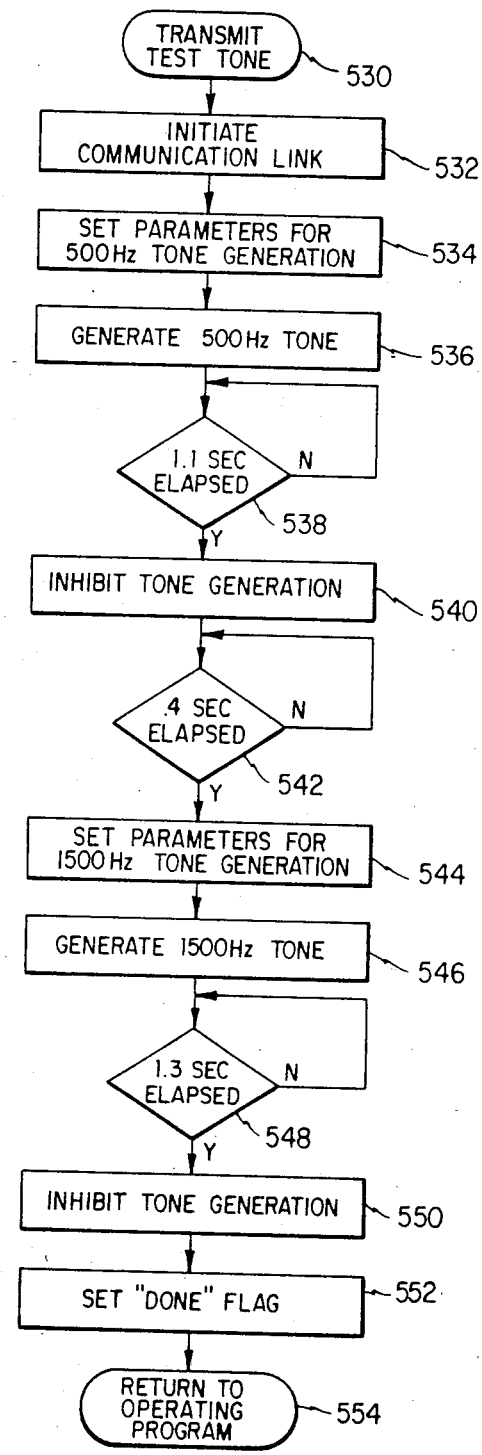
FIG. 13 is a flow chart for the transmission program to transmit a test tone.

Referring now to FIG. 13, there is illustrated a flow chart for the operation in which the test tones are transmitted from one of the communication units. Prior to transmitting the test tones, a communication link is effected between the two channels. Once the communications channel is effected, the channel is then ready for voice transmission. Once the system is ready for the integrity check, the program of FIG. 13 is initiated at the start block 530 labeled "Transmit Test Tone". The program then flows to a function block 532 wherein the communication link is effected, as described above. After the communication link is effected, the program flows to the function block 534 to set the parameters for the low frequency tone. In the preferred embodiment, this low frequency tone is approximately 500 Hz. In setting the parameters for the 500 Hz tone generation, it is necessary to first reset all the functions in the delta modulator and the associated components illustrated in FIG. 11. The information in the level set ROM is then passed through the multiplexer 502 to the CVSD circuit 500 to set the level therein to make it ready for tone generation.

After the parameters have been set, the program flows to a function block 536 wherein the 500 Hz tone is generated and the pattern stored in the waveform ROM 506 is input to the CVSD circuit 500. The program then flows to a decision block 538 to determine whether 1.1 seconds has elapsed. If this duration of time has not elapsed, the program returns back to the input of the decision block 538 along the "N" path and, if the duration of time has elapsed, the program flows along the "Y" path to a function block 540 which inhibits tone generation. The function blocks 534–540 therefore represent the portion of the program that controls the generation of the low frequency tone.

After the tone has been inhibited in the function block 540, the program flows to a decision block 542 to determine if 0.4 seconds has elapsed during the time in which the tone generation is inhibited. This duration of time is termed "Quiet" time. If 0.4 seconds has not elapsed during this duration, the program flows along the "N" path thereof back to the input. When 0.4 seconds has elapsed, the program flows along the "Y" path thereof to a function block 544 wherein the parameters for generation of the high frequency tone are set. In the preferred embodiment, the high frequency tone is approximately 1500 Hz. The parameters are set in a similar manner to those represented by the function block 534 except that the clock 512 is operating at a higher frequency. This pattern corresponds to the generation of a high frequency tone.

After the high frequency parameters have been set, the program flows to a function block 546 wherein the 1500 Hz tone is generated. The program then flows to a decision block 548 to determine if 1.3 seconds has elapsed. If not, the program flows along the "N" path thereof back to the input of the decision block 548 or, if the duration of time has elapsed, the program flows along the "Y" path thereof to a function block 550 that inhibits tone generation. After the high frequency tone has been generated, the program flows to a function block 552 to set a "DONE" flag. This is a software flag which indicates to the main program that normal transmission reception of voice messages and information on the channel are permissible. After the flag is set, the program flows to a return block 554.

Figure 14:
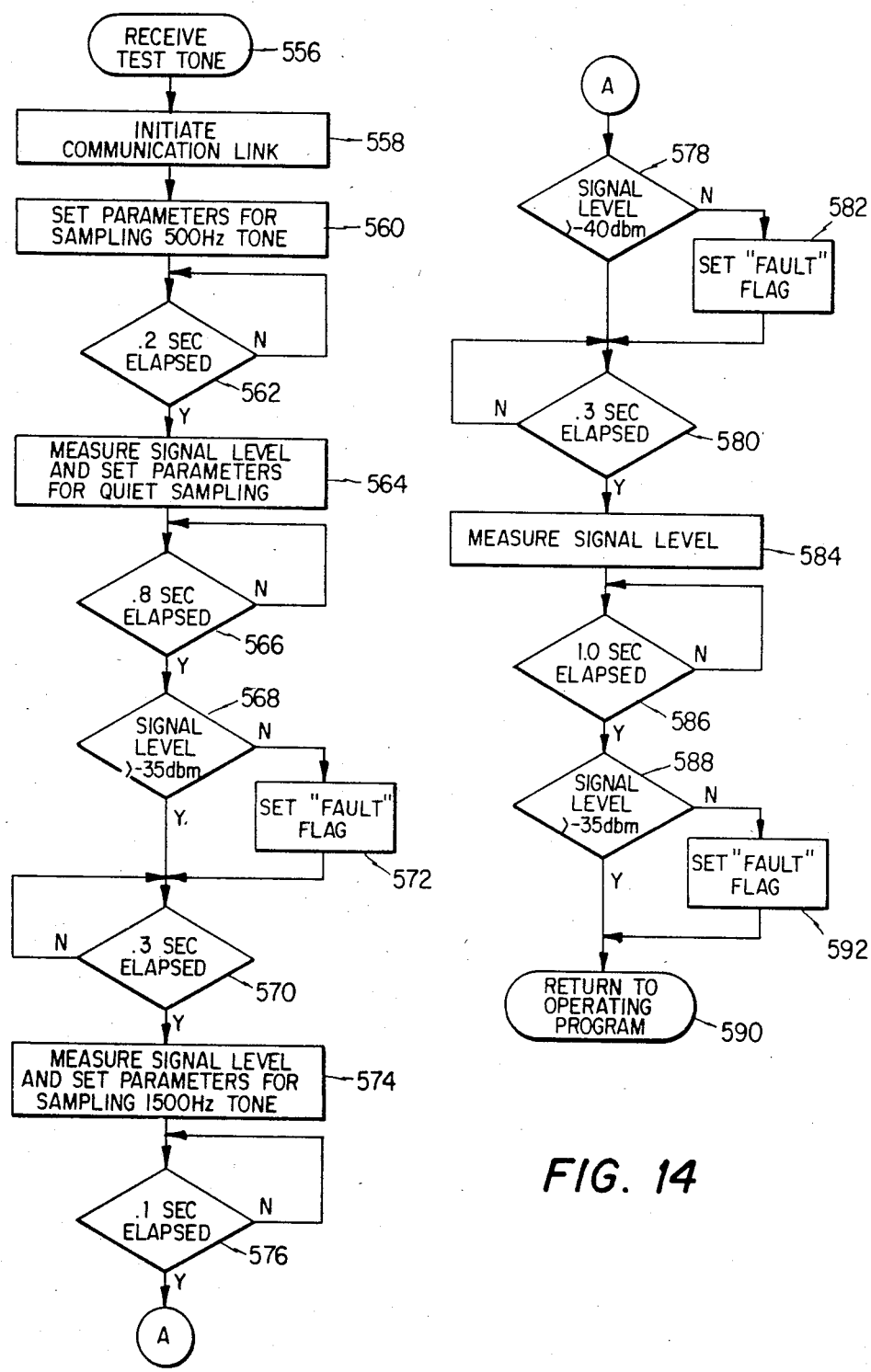
FIG. 14 is a flow chart for the receive program to receive the test tone.

Referring now to FIG. 14, there is illustrated a flow chart depicting the operation of the receiving system. The program is initiated in a start block 556 labeled "Receive Test Tone". The program then flows to a function block 558 to effect, the communication link. Once the communication link is effected, the transmitting and receiving systems are synchronized such that the receiving system can determine when the transmitting system is going to transmit the tones.

Once the communication link is effected the program flows to a function block 560 to set the parameters for sampling the 500 Hz tone. In the preferred embodiment, this is essentially an adjustment of the programmable game amplifier described above with reference to FIGS. 10a–10c. Since the programmable game amplifier 244 has a limited dynamic range, the gain of the programmable game amplifier 244 is set such that a given range is measured. In this manner, it can be determined whether the signal is above or below this range. After the parameters have been set, the program flows to the input of a decision block 562 to determine if a predetermined duration of time has elapsed. In the preferred embodiment, this predetermined duration of time is 0.2 seconds. The program flows along the "N" path of the decision block 562 until the duration has elapsed. After 0.2 seconds has elapsed, the program flows along the "Y" path to a function block 564 where the signal level is measured and the parameters are set for "Quiet" time sampling; that is, the time during which transmission is inhibited from the transmitting system which is a measurement of the noise floor of the channel. The program then flows to the input of a decision block 566 to determine if 0.8 seconds has elapsed. Until this duration of time has elapsed, the program flows around a "N" path back to the input thereof. After 0.8 seconds has elapsed, the program flows along the "Y" path thereof to input of a decision block 568.

The decision block 568 determines whether the signal level is greater than −35 dbm. If the signal level is greater than −35 dbm, the program flows along the "Y" path thereof to the input of a decision block 570. However, if the signal is less than −35 dbm, the program flows along the "N" path from the decision block 568 to the input of a function block 572 to set a "Fault" flag. The program then flows to the input of the decision block 570. The decision block 570 determines whether a duration of 0.3 seconds has elapsed. If not, the program flows back to the input thereof along the "N" path and, if the duration has elapsed, the program flows along the "Y" path thereof.

As described above with reference to the decision block 538 of FIG. 13, the 500 Hz tone is generated for 1.1 seconds. In order to account for extraneous delays that may be incurred in the communication link, the 0.2 second duration of decision block 562 ensures that the signal is present. The 0.8 second duration of decision block 566 allows adequate time for the measurement to take place. After the measurement has taken place, the receive system remains idle for 0.3 seconds, as indicated by the decision block 570. This allows sufficient time between the various tasks.

After 0.3 seconds has elapsed, the program flows from the decision block 570 to the input of a function block 574 wherein the signal level is measured and the parameters are set for sampling the 1500 Hz tone. The program then flows to the input of a decision block 576 to determine if 0.1 seconds has elapsed. If not, the program flows back to the input thereof along the "N" path and, when the duration of time has elapsed, the program flows along the "Y" path thereof to the input of a decision block 578 to determine whether the signal is less than −40 dbm. If the signal is less than −40 dbm, the program flows along the "Y" path thereof to the input of a decision block 580 and, if the signal level is above −40 dbm, the program flows along the "N" path to the input of a function block 582 wherein the "Fault" flag is set. The decision block 578 represents the step wherein the noise floor is measured during the "Quiet" time such that a determination can be made whether the noise floor is above a −40 dbm level.

After measuring the noise floor during "Quiet" time, the program flows to the decision block 580 to determine whether 0.3 seconds has elapsed. Until 0.3 seconds has elapsed, the program returns to the input of the decision block 580 along the "N" path and, when 0.3 seconds has elapsed, the program flows along the "Y" path thereof to the input of a function block 584.

The function block 584 indicates measurement of the signal level for the 1500 Hz tone since the parameters for measurement of the 1500 Hz tone were set in the function block 574. The duration of time from the input of the decision block 570 to the input of the function block 584 should allow sufficient time for the transmitting system to transmit the 1500 Hz tone. The program then flows to the decision block 586 to determine whether 1.0 seconds has elapsed. During this 1.0 seconds, the signal level is being measured and the program flows along the "N" path of the decision block 586 back to the input thereof. After this time has elapsed, the program flows to the input of a decision block 588 to determine whether the signal level was greater than −35 dbm. If the signal level was greater than −35 dbm, the program flows along the "Y" path thereof to the input of a return block 590 to return to the operating program. If, however, the level was below −35 dbm, the program flows along the "N" path from the decision block 588 to the input of a function block 592 to set the "Fault" flag. The program then flows to the input of the return block 590. Once the "Fault" flag is set in either the function block 572, the function block 582 or the function block 592, the program will always return to the operating program with this flag set. If the flag is set, the program can either disconnect, thus requiring the transmitting system to reaccess or it can transmit a digital signal back to the transmitting system to initiate the tests once again.

In an alternate embodiment of the present invention, tones are generated by the tone generator 166 of FIG. 9 and the tone receiver 164 in the receiving system receives these tones. The tones are generated in a predetermined pattern, which pattern is stored at the receiving system. When the receiving system receives the pattern of tones, it deciphers the pattern and compares this pattern with the stored predetermined pattern. If the comparison is valid between the stored pattern and the detected pattern, then the communication link is acceptable. By dispersing the tones output by the tone generator 166 over the bandwidth of the channel, a determination can be made as to the integrity of not only a given portion of the band, but also of the entire voice bandwidth. Since the tone generator generates tones that are outside the voice bandwidth, it is only necessary to restrict the generated tones in the pre-stored patterns to those within the voice frequency range.

In summary, there has been provided a system for checking the integrity of a communications channel between communications systems or communication networks. This system includes a tone generating device that generates discrete tones at various locations within the channel bandwidth. The receiving system is synchronized with the transmitting system such that detection of the tone or tones is made in accordance with a predetermined timing scheme. In addition to measuring the tones, the noise floor is also measured at the receiver. To measure the signal level, only detection of the level is needed since the tones are transmitted individually. By comparing the measured level with predetermined criteria, the integrity of the channel can be determined for both detected signals and the detected noise levels.

Although the preferred embodiment has been described in detail, it should be understood that various changes, substitutions and alterations can be made herein without departing from the spirit and scope of the invention as defined by the appended claims.

What is claimed is:

1. An apparatus for performing an integrity check on a communications channel interconnecting a pair of voice store and forward systems, comprising:

frequency means for generating a plurality of discrete frequencies covering the bandwidth of the communications channel;

means for controlling said frequency means to output said discrete frequencies in a predetermined pattern from one of the voice store and forward systems for transmission on the communications channel, said discrete frequencies output at a predetermined power level;

means for receiving said discrete frequencies at the other of the voice store and forward systems over the communications channel;

means for measuring a predetermined parameter of the discrete frequencies received by said receiving means;

means for comparing the measured parameter of the received discrete frequencies with predetermined criteria to determine the integrity of the communications channel; and means for transmitting voice messages from one voice store and forward system to the other only if the integrity of the communications channel meets a predetermined criteria.

2. The apparatus of claim 1 wherein only two frequencies are generated, one at the high end of a desired portion of the frequency spectrum and one at the low end of said desired portion of the frequency spectrum.

3. The apparatus of claim 2 wherein each of said high and low discrete frequencies are sequentially transmitted, each for a predetermined duration of time.

4. The apparatus of claim 1 wherein the parameter measured by said measuring means is a power level.

5. The apparatus of claim 1 wherein the parameter measured by said measuring means is frequency for each said discrete frequencies received by said receiving means.

6. The apparatus of claim 1 wherein said means for controlling inhibits the output of said discrete frequencies for a predetermined duration of quiet time such that said means for measuring the power level of the discrete frequencies can measure the noise floor of the communications channel.

7. An apparatus for performing an integrity check on a communications channel between two voice store and forward systems, comprising:

frequency means for generating first and second signals at predetermined power levels, said first signal having a discrete frequency proximate the low end of the bandwidth for the communications channel and said second signal having a discrete frequency proximate the high end of the bandwidth for the communications channel;

control means for controlling said frequency means to output an initial quiet period with no signal present, a second period with said first signal present and a third period with said second signal present, said first, second and third period having preset durations of times;

a receiver on the other of the two voice store and forward systems connected to the communications channel for receiving said first and second signals therefrom;

a power level detector for detecting the power level of signals received by said receiver;

means for comparing the output of said detector with a first reference level during said quiet time period;

means for comparing the output of said detector with a second reference level during said second period with said first signal present;

means for comparing the output of said detector with a third reference level during said third period when said second signal is present; and means for determining the integrity of the communications channel from the information generated by said comparing means, the comparison being valid if the reference level during said first period is less than said first level and the level during said second and third periods is greater than said second and third reference levels, respectively.

8. The apparatus of claim 7 wherein said discrete frequencies are sequentially generated according to a predetermined pattern and said receiving means sequentially receives said sequential discrete frequencies, said predetermined criteria comprised of said predetermined pattern.

9. The apparatus of claim 7 wherein said frequency means comprises a tone generator and said receiver comprises a tone receiver.

10. The apparatus of claim 7 wherein said second and third reference levels are equal.

11. An apparatus for performing an integrity check on a communications channel between two voice store and forward systems, comprising:

a tone generator for generating a plurality of discrete frequencies covering the bandwidth of the communications channel;

means for controlling said tone generator to output said discrete frequencies in a predetermined pattern from one of the voice store and forward systems to the communications channel;

a tone receiver disposed at the other of the voice store and forward systems and interfaced with the communications channel, said tone receiver outputting a signal indicative of the discrete frequencies received; and means for comparing the pattern of received discrete frequencies with predetermined patterns stored internal to the receiving one of the voice store and forward systems, the integrity of a communications channel being valid if a true comparison is made and being invalid if a false comparison is made.

12. A method determining the integrity of a communications channel that is connected between two voice store and forward systems, comprising;

transmitting a plurality of signals from one of the voice store and forward systems to the communications channel according to a predetermined pattern, each of the signals having predetermined characteristics therefor;

receiving the predetermined pattern of signals at the other voice store and forward systems from the communications channel;

measuring the characteristics of the received signals;

comparing the measured characteristics with the predetermined characteristics to determine the effect that the communications channel had on the signal such that a determination of the integrity of the communications channel can be made; and transmitting voice messages from one voice store and forward system via the communications channel to the other voice store and forward system if the integrity of the communications channel meets the prescribed criteria.

13. The method of claim 12 wherein the signals are discrete frequencies having predetermined power levels.

14. The method of claim 12 wherein the predetermined characteristic of the signals is the frequency thereof.

15. The method of claim 12 wherein the characteristic measured is power level.

16. The method of claim 12 wherein the signals comprise discrete frequencies and the step of measuring the characteristics comprises detecting the power level of each of the signals and comparing them with a reference level to determine if they are greater than the reference level such that loss in the communications channel can be accounted for.

17. The method of claim 16 wherein the predetermined pattern has a duration of quiet time disposed therein wherein no signal is transmitted such that a measurement of the noise floor can be obtained at the receiving one of the voice store and forward systems, the measurement of the noise floor level compared to a second reference level to determine whether the noise floor is below the second reference level.

18. The method of claim 17 wherein the step of measuring comprises:

measuring the frequency of the received signals and the sequence in which the received signals are received; and comparing the sequence of frequencies with the predetermined pattern that is stored at the receiving one of the voice store and forward systems, the integrity of the channel determined upon whether the proper pattern has been received.

19. The method of claim 12 wherein the predetermined characteristic of the signals is frequency and the predetermined pattern is a sequence of the signals having different frequencies therefor.

20. A method for determining the integrity of a communications channel between two voice store and forward systems, comprising:

transmitting a first tone signal over the communications channel from one voice store and forward system to another, the frequency of the first tone signal being proximate the low frequency end of the communications channel bandwidth;

receiving the first tone signal from the communications channel at the other voice store and forward system;

measuring the power level of the received first tone signal and comparing it with a first reference level to determine if the power level thereof is greater than the first reference level;

inhibiting transmission of signals over the communications channel for a predetermined duration of time;

measuring the noise floor during the predetermined duration of time in comparing the power level for the noise floor to a second reference level to determine if the noise floor is below the second reference level;

transmitting a second tone signal over the communications channel from one voice store and forward system to another, the second tone signal having a frequency proximate the high frequency end of the communications channel bandwidth;

receiving the second tone signal from the communications channel at the other voice store and forward system;

measuring the level of the second tone signal and comparing it with a third reference level to determine if it is greater than the third reference level, the integrity of the communications channel a function of whether the first and second tone signals are greater than the first and third reference levels and the noise floor level is below the second reference level; and transmitting voice information from one voice store and forward system to the other if the integrity of the communications channel is determined to be adequate.

21. A method for determining the integrity of a communications channel between voice store and forward systems comprising:

generating a plurality of discrete tone signals in a predetermined pattern;

transmitting the predetermined pattern over the communications channel from one of the voice store and forward systems to the other voice store and forward systems;

receiving the predetermined pattern from the communications channel at the other voice store and forward system;

detecting the frequency of each of the tones in their received pattern and determining the sequence of tones such that the sequence can be compared with the predetermined pattern to determine the integrity of the channel; and transmitting voice information from one of the voice store and forward systems to the other if the integrity of the channel is determined to be adequate.

* * * * *